(12) United States Patent
Choi et al.

(10) Patent No.: US 12,375,657 B2
(45) Date of Patent: *Jul. 29, 2025

(54) IMAGE CODING METHOD BASED ON CHROMA DEBLOCKING PARAMETER INFORMATION FOR MONOCHROME COLOR FORMAT IN VIDEO OR IMAGE CODING SYSTEM

(71) Applicant: LG Electronics Inc., Seoul (KR)

(72) Inventors: Jangwon Choi, Seoul (KR); Jungah Choi, Seoul (KR); Jin Heo, Seoul (KR); Sunmi Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,894

(22) Filed: Sep. 7, 2023

(65) Prior Publication Data
US 2023/0421760 A1  Dec. 28, 2023

Related U.S. Application Data

(63) Continuation of application No. 17/857,322, filed on Jul. 5, 2022, now Pat. No. 11,792,395, which is a
(Continued)

(51) Int. Cl.
*H04N 11/02* (2006.01)
*H04N 19/117* (2014.01)
(Continued)

(52) U.S. Cl.
CPC ......... *H04N 19/117* (2014.11); *H04N 19/132* (2014.11); *H04N 19/176* (2014.11);
(Continued)

(58) Field of Classification Search
CPC .. H04N 19/117; H04N 19/132; H04N 19/176; H04N 19/186; H04N 19/46; H04N 19/82
(Continued)

(56) References Cited

U.S. PATENT DOCUMENTS 11,792,395 B2 * 10/2023 Choi .................... H04N 19/176
375/240.02
2017/0295369 A1 * 10/2017 Nakagami .............. H04N 19/86
(Continued)

FOREIGN PATENT DOCUMENTS

JP          2021-158633       10/2021
KR     10-2014-0120346       10/2014
(Continued)

OTHER PUBLICATIONS

Bross et al., "Versatile Video Coding (Draft 8)," Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020, 512 pages.
(Continued)

*Primary Examiner* — Jayanti K Patel
*Assistant Examiner* — Richard B Carter
(74) *Attorney, Agent, or Firm* — Fish & Richardson P.C.

(57) ABSTRACT

According to a disclosure of the present document, information associated with a deblocking filter for performing deblocking filtering may include chroma component filter parameter information associated with deblocking parameter offsets that are applied to a chroma component. The chroma component filter parameter information may be selectively signaled on the basis of a chroma tool offset presence flag. Therefore, an effect of increasing overall coding efficiency may be derived by signaling chroma component filter parameter information only in the case of not a monochrome color format.

14 Claims, 15 Drawing Sheets

Related U.S. Application Data continuation of application No. PCT/KR2021/003896, filed on Mar. 30, 2021.

(60) Provisional application No. 63/004,434, filed on Apr. 2, 2020.

(51) Int. Cl.
  *H04N 19/132* (2014.01)
  *H04N 19/176* (2014.01)
  *H04N 19/186* (2014.01)
  *H04N 19/46* (2014.01)
  *H04N 19/82* (2014.01)

(52) U.S. Cl.
  CPC ........... *H04N 19/186* (2014.11); *H04N 19/46* (2014.11); *H04N 19/82* (2014.11)

(58) Field of Classification Search
  USPC .................................................... 375/240.02
  See application file for complete search history.

(56) References Cited

U.S. PATENT DOCUMENTS

2022/0368909 A1* 11/2022 Park .................... H04N 19/174
2023/0007253 A1* 1/2023 Wang .................... H04N 19/48

FOREIGN PATENT DOCUMENTS

| KR | 10-2016-0055771 | 5/2016 |
|---|---|---|
| KR | 10-2016-0068288 | 6/2016 |
| WO | WO 2021/155740 | 8/2021 |
| WO | WO 2021/155834 | 8/2021 |
| WO | WO 2021/170036 | 9/2021 |

OTHER PUBLICATIONS

Li et al., "AHG12: Signaling of chroma presence in PPS and APS," Joint Video Experts Team (JVET) of ITU-T SG 16 WP 3 and ISO/IEC JTC 1/SC 29/WG 11, Document: JVET-Q0420-v1, 17th Meeting: Brussels, BE, Jan. 7-17, 2020, 3 pages.
Office Action in Indian Appln. No. 202217062024, dated Dec. 20, 2023, 7 pages.
Office Action in Japanese Appln. No. 2022-559862, dated Nov. 21, 2023, 8 pages (with English translation).
Choi et al., "AHG9: On signaling of chroma deblocking offsets in monochrome picture," JVET-R0152, Joint Video Experts (JVET) of ITU-T SG 16 WP 3 and ISO/IEC JTC 1/SC 29/WG 11, Meeting #18, by teleconference, Apr. 15-24, 2020, 4 pages.
Extended European Search Report in European Appln. No. 21778729.0, mailed on Mar. 19, 2024, 13 pages.
Sun et al., "AHG9: On signaling of deblocking parameters for coding monochrome pictures," JVET-R0078, Joint Video Experts Team (JVET) of ITU-T SG 16 WP 3 and ISO/IEC JTC 1/SC 29/WG 11, Meeting #18, by teleconference, Apr. 15-24, 2020, 6 pages.
Xu et al., "AHG9: On deblocking control parameters," JVET-Q0121-v1, Joint Video Experts Team (JVET) of ITU-T SG 16 WP 3 and ISO/IEC JTC 1/SC 29/WG 11, Meeting #17, Brussels, BE, Jan. 7-17, 2020, 7 pages.
Zhang et al., "Non-CE: Various chroma format support in VVC," JVET-O0616, Joint Video Experts Team (JVET) of ITU-T SG 16 WP 3 and ISO/IEC JTC 1/SC 29/WG 11, Meeting #15, Gothenburg, SE, Jul. 3-12, 2019, 3 pages.

* cited by examiner

IMAGE CODING METHOD BASED ON CHROMA DEBLOCKING PARAMETER INFORMATION FOR MONOCHROME COLOR FORMAT IN VIDEO OR IMAGE CODING SYSTEM

CROSS-REFERENCE TO RELATED APPLICATIONS

This application is a continuation of U.S. application Ser. No. 17/857,322, filed on Jul. 5, 2022, which is a continuation of International Application PCT/KR2021/003896, with an international filing date of Mar. 30, 2021, which claims the benefit of U.S. Provisional Patent Application No. 63/004,434, filed Apr. 2, 2020, the contents of which are hereby incorporated by reference herein in their entirety.

TECHNICAL FIELD

The present document relates to a video/image coding technology, and more particularly, to an image coding method based on chroma deblocking parameter information in a video or image coding system for a monochrome color format.

BACKGROUND

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An exemplary embodiment of the present document provides a method and an apparatus for enhancing video/image coding efficiency.

An exemplary embodiment of the present document provides a method and an apparatus for efficiently signaling information related to a deblocking filter.

An exemplary embodiment of the present document provides a method and an apparatus for efficiently signaling chroma deblocking parameter information for a monochrome color format at a PPS level.

An exemplary embodiment of the present document provides a method and an apparatus for efficiently signaling chroma deblocking parameter information for a monochrome color format at a PH level.

An exemplary embodiment of the present document provides a method and an apparatus for efficiently signaling chroma deblocking parameter information for a monochrome color format at an SH level.

An exemplary embodiment of the present document provides a method and an apparatus for selectively signaling deblocking parameter information being applied to a luma component and deblocking parameter information being applied to a chroma component in a video/image of various color formats.

An exemplary embodiment of the present document provides a video/image decoding method performed by a decoding apparatus.

An exemplary embodiment of the present document provides a decoding apparatus for performing a video/image decoding.

An exemplary embodiment of the present document provides a video/image encoding method performed by an encoding apparatus.

An exemplary embodiment of the present document provides an encoding apparatus for performing video/image encoding.

An exemplary embodiment of the present document provides a computer readable digital storage medium in which encoded video/image information generated by the video/image encoding method disclosed in at least one of the exemplary embodiments of the present document is stored.

An exemplary embodiment of the present document provides a computer readable digital storage medium in which encoded information or encoded video/image information causing the video/image decoding method disclosed in at least one of the exemplary embodiments of the present document to be performed by the decoding apparatus is stored.

The exemplary embodiment of the present document can enhance the overall image/video compression efficiency.

The exemplary embodiment of the present document can efficiently signal the information related to the deblocking filter.

The exemplary embodiment of the present document can efficiently signal the chroma deblocking parameter information for the monochrome color format at the PPS level.

The exemplary embodiment of the present document can efficiently signal the chroma deblocking parameter information for the monochrome color format at the PH level.

The exemplary embodiment of the present document can efficiently signal the chroma deblocking parameter information for the monochrome color format at the SH level.

The exemplary embodiment of the present document can selectively signal the deblocking parameter information being applied to the luma component and the deblocking parameter information being applied to the chroma component in the video/image of various color formats.

DETAILED DESCRIPTION

Figure 1:
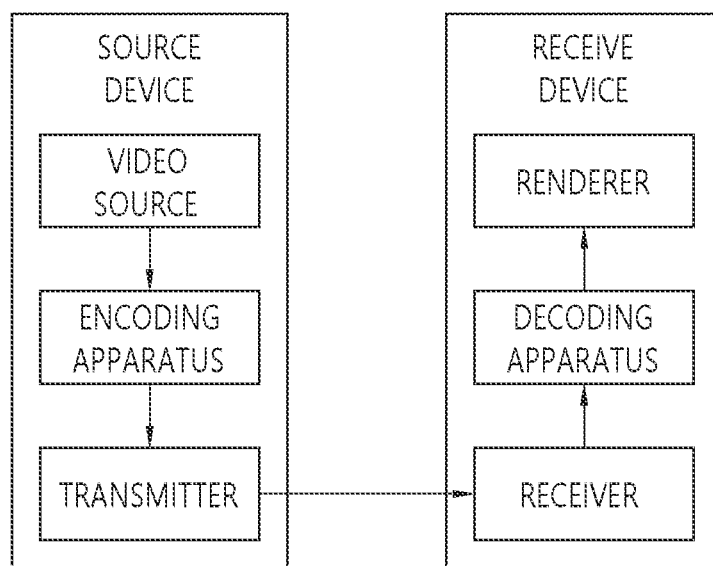
FIG. 1 schematically illustrates an example of a video/image coding system to which exemplary embodiments of the present document are applicable.

This document may be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present document are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to a video/image coding. For example, methods/exemplary embodiments disclosed in the present document are applicable to a method disclosed in a versatile video coding (VVC) standard. Further, the methods/exemplary embodiments disclosed in the present document are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This document presents various embodiments of video/image coding, and the embodiments may be performed in combination with each other unless otherwise mentioned.

In the present document, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present document, "A or B" may mean "only A", "only B", or "both A and B". In other words, in the present document, "A or B" may be interpreted as "A and/or B". For example, in the present document, "A, B, or C" may mean "only A", "only B", "only C", or "any combination of A, B, and C".

A slash (/) or a comma used in the present document may mean "and/or". For example, "A/B" may mean "A and/or B". Therefore, "A/B" may mean "only A", "only B", or "both A and B". For example, "A, B, C" may mean "A, B, or C".

In the present document, "at least one of A and B" may mean "only A", "only B", or "both A and B". Further, in the present document, expressions of "at least one of A or B" or "at least one of A and/or B" may be interpreted the same as "at least one of A and B".

Further, in the present document, "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present document may mean "for example". Specifically, if it is indicated by a "prediction (intra prediction)", an "intra prediction" may be proposed as an example of the "prediction". In other words, the "prediction" in the present document is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present document, a technical feature individually described in one drawing may also be individually implemented, and also be simultaneously implemented.

Figure 2:
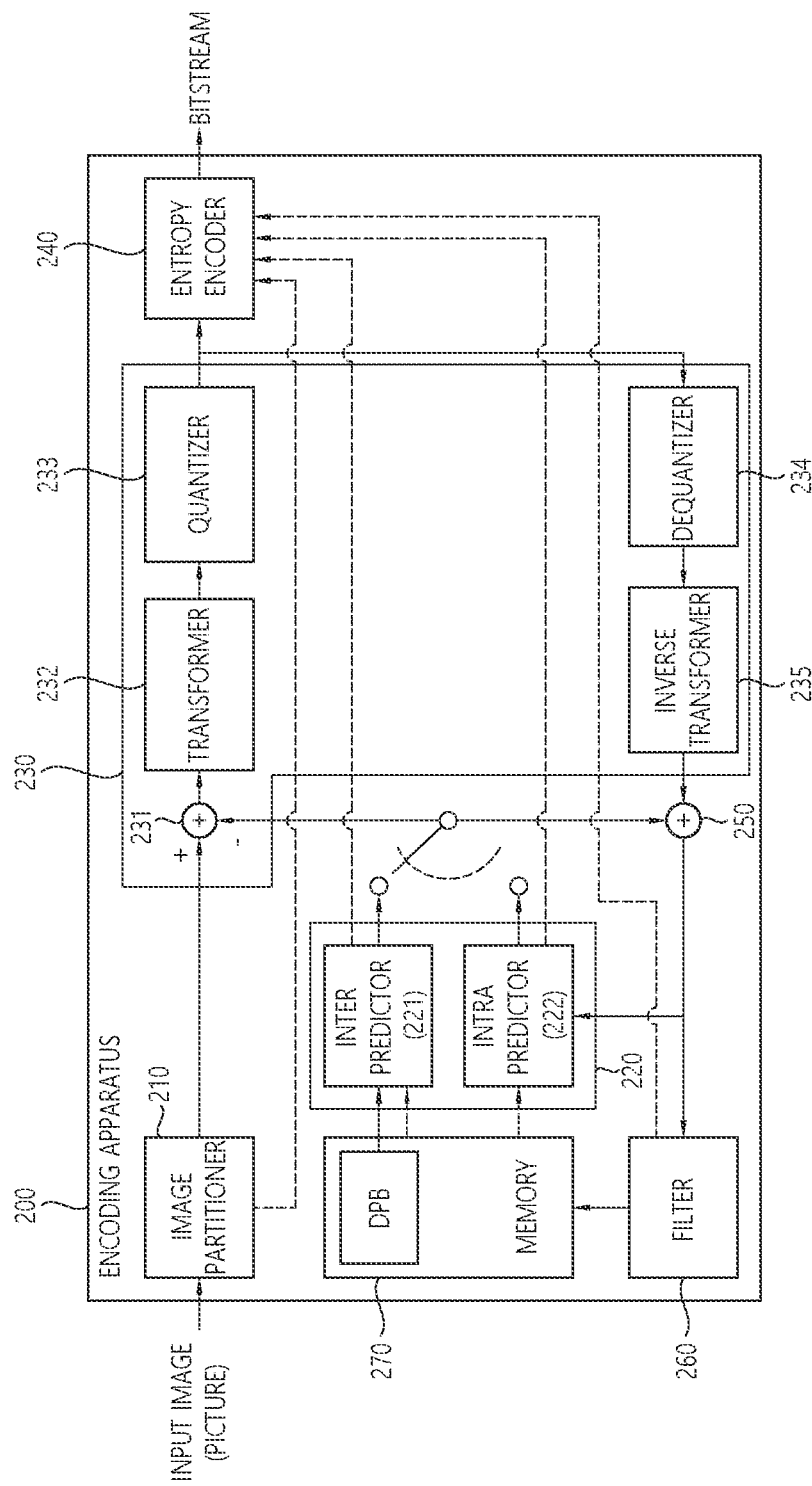
FIG. 2 is a diagram for schematically explaining a configuration of a video/image encoding apparatus to which the exemplary embodiments of the present document are applicable.

FIG. 2 is a diagram for schematically explaining a configuration of a video/image encoding apparatus to which exemplary embodiments of the present document are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode being applied to the current block by using a prediction mode being applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
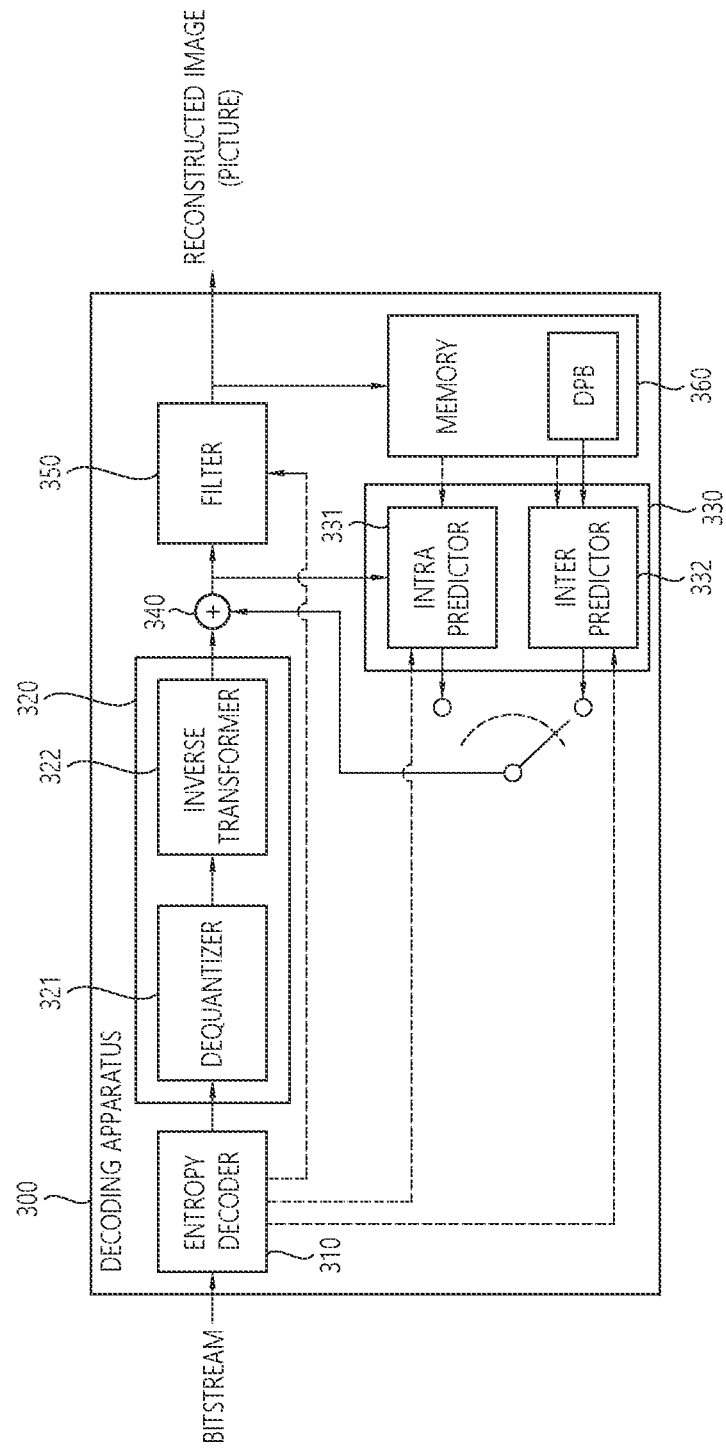
FIG. 3 is a diagram for schematically explaining a configuration of a video/image decoding apparatus to which the exemplary embodiments of the present document are applicable.

FIG. 3 is a diagram schematically explaining a configuration of a video/image decoding apparatus to which exemplary embodiments of the present document are applicable. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor being applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode being applied to the current block by using a prediction mode being applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode being applied to the current block by using the prediction mode being applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this document, the embodiments described in the filter 260, the inter predictor 221, and the intra predictor 222 of the encoding apparatus 200 may be the same as or may be respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Figure 4:
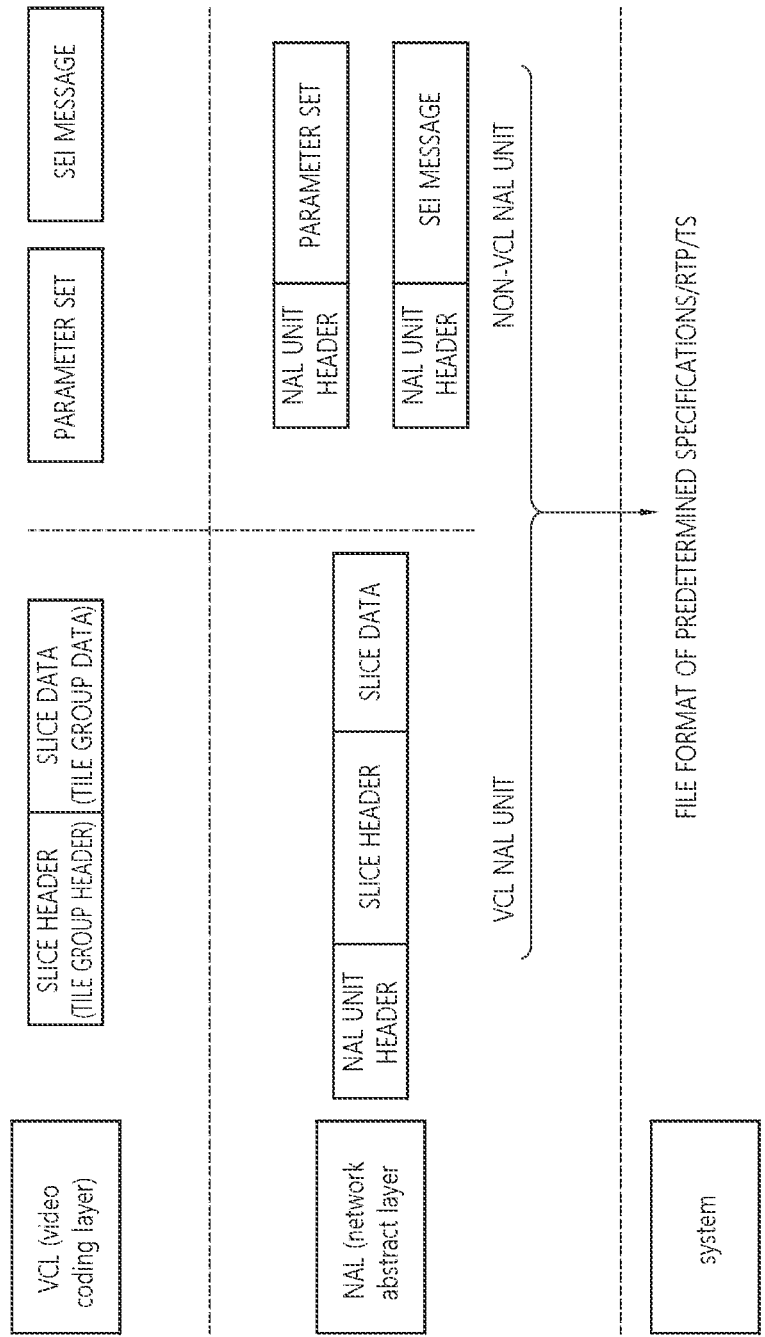
FIG. 4 exemplarily illustrates a hierarchical structure for the coded video/image.

FIG. 4 exemplarily illustrates a hierarchical structure for the coded video/image.

Referring to FIG. 4, the coded video/image may be classified into a video coding layer (VCL) which deals with a decoding processing of videos/images and themselves, a subsystem for transmitting and storing encoded information, and a network abstraction layer which exists between the VCL and the subsystem and is in charge of a network adaption function.

In the VCL, VCL data including compressed image data (slice data) may be generated, or a parameter set including information, such as a picture parameter set (PPS), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in the VCL. In this case, the RBSP refers to slice data, parameter set, SEI message, and the like, generated in the VCL. The NAL unit header may include NAL unit type information specified according to RBSP data included in the corresponding NAL unit.

As illustrated in FIG. 4, the NAL unit may be classified into a VCL NAL unit and a Non-VCL NAL unit according to the RBSP generated in the VCL. The VCL NAL unit may mean a NAL unit that includes information on the image (slice data), and the Non-VCL NAL unit may mean a NAL unit that includes information (parameter set or SEI message) required for decoding the image.

As described above, the VCL NAL unit and the Non-VCL NAL unit may be transmitted through a network through attachment of header information thereto according to the data standard of the subsystem. For example, the NAL unit may be transformed into a data format of a predetermined standard, such as an H.266/VVC file format, a real-time transport protocol (RTP), a transport stream (TS), and the like, and may be transmitted through various networks.

As described above, the NAL unit may be specified with the NAL unit type according to the RBSP data structure included in the corresponding NAL unit, and information on the NAL unit type may be stored in the NAL unit header to be signaled.

For example, the NAL unit may be briefly classified into a VCL NAL unit type and a Non-VCL NAL unit type depending on whether the NAL unit includes information (slice data) about an image. The VCL NAL unit type may be classified according to the nature and type of pictures included in the VCL NAL unit, and the Non-VCL NAL unit type may be classified according to the type of the parameter set.

The following is an example of the NAL unit type specified according to the type of the parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types may have syntax information for the NAL unit type, and the syntax information may be stored in a NAL unit header to be signaled. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (set of slice headers and slice data) in one picture. The picture header (picture header syntax) may include information/parameters commonly applicable to the picture. For example, one picture may be composed of different types of slices, such as an intra-coded slice (i.e., I-slice) and/or inter-coded slices (i.e., P-slice and B-slice). In this case, the picture header may include information/parameters being applied to the intra-coded slice and the inter-coded slices. Further, one picture may be composed of one type of slices.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high-level syntax (HLS) in the present document may include at least one of the APS syntax, the PPS syntax, the SPS syntax, the VPS syntax, the DPS syntax, picture header syntax, and the slice header syntax.

In the present document, the video/image information encoded from the encoding apparatus to the decoding apparatus and signaled in the form of the bitstream may include information included in the slice header, information included in the picture header, information included in the APS, information included in the PPS, information included in the SPS, information included in the VPS, and/or information included in the DPS as well as partitioning-related information in the picture, intra/inter prediction information, residual information, and in-loop filtering information. Further, the video/image information may further include information of the NAL unit header.

In the present document, the source or coded picture/image may be composed of one or three sample arrays. For example, the source or coded picture/image may include only a luma component array (monochrome).

Alternatively, the source or coded picture/image may include a luma component array, and in some cases, it may further include two chroma component (cb, cr) arrays. That is, one pixel (sample) constituting the picture/image may include a luma sample array and a chroma sample (cb, cr) array.

In relation to this, a color format is related to a sampling format of chroma components. That is, the color format may represent a configuration format of a luma component and chroma components (cb, cr), and may be called a chroma format. The color format may be predetermined, or may be adaptively signaled. For example, the chroma format may be determined based on at least one of a syntax element chroma_format_idc related to the color format as in Table 1 below and a syntax element separate_colour_plane_flag related to whether three color components are individually coded in case that the chroma format is 4:4:4.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

That is, if the chroma format is monochrome sampling, only a luma array that is only one sample array may be present. If the chroma format is 4:2:0 sampling, each of two chroma arrays has a height that is half the height of the luma array, and a width that is half the width of the luma array. If the chroma format is 4:2:2 sampling, each of the two chroma arrays has the same height as the height of the luma array, and the same width as the width of the luma array. If the chroma format is 4:4:4 sampling, the height and the width are determined based on the value of the separate_colour_plane_flag. If the value of the separate_colour_plane_flag is 0, each of the two chroma arrays has the same height as the height of the luma array, and the same width as the width of the luma array. If the value of the separate_colour_plane_flag is 1, three color components are considered as a monochrome sampling picture, and are individually coded.

In Table 1 above, SubWidthC and SubHeightC represent a ratio between the luma sample and the chroma sample. For example, if the value of the chroma format ide is 3, the chroma format is 4:4:4. In this case, if the width of the luma sample block is 16, the corresponding width of the chroma sample block is 16/SubWidthC.

Further, in general, chroma sample related information is parsed in case that a value of a variable ChromaArrayType (chroma array type) is not 0. Here, the ChromaArrayType is a variable related to the sampling format of the chroma components, and if the value of the separate_colour_plane_flag is 0, the value of the ChromaArrayType is configured to be the same as the value of the chroma_format_idc, whereas if the value of the separate_colour_plane_flag is 1, the value of the ChromaArrayType is configured to be 0.

Figure 5:
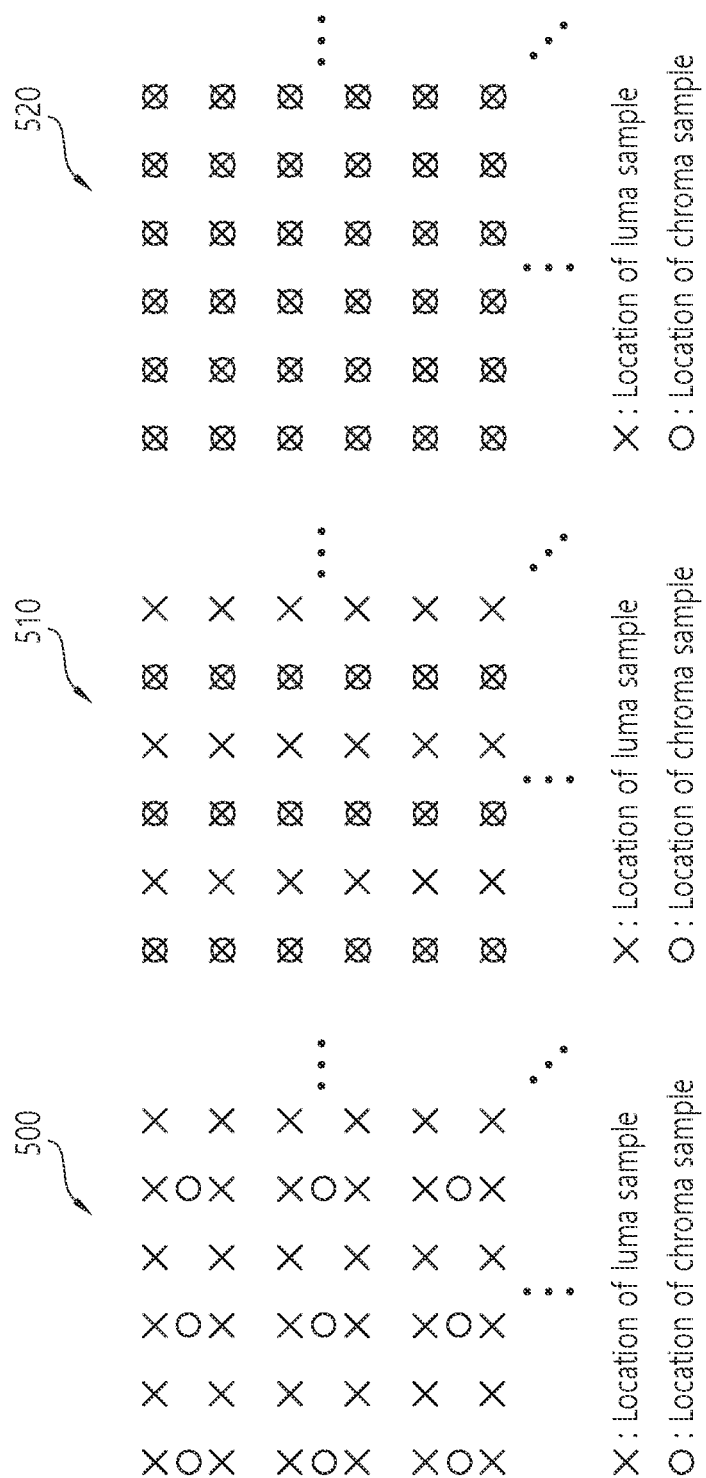
FIG. 5 exemplarily illustrates locations of luma samples and chroma samples in a picture according to a chroma format.

FIG. 5 exemplarily illustrates locations of luma samples and chroma samples in a picture according to a chroma format.

For example, the reference numeral "500" of FIG. 5 may denote relative vertical or horizontal locations of luma samples and chroma samples in a picture in case that the value of chroma_format_idc is 1, that is, in case that the chroma format is 4:2:0. The reference numeral "510" of FIG. 5 may denote relative locations of luma samples and chroma samples in a picture in case that the value of chroma_format_idc is 2, that is, in case that the chroma format is 4:2:2, and the respective chroma samples may be present at the same locations as those of the corresponding luma samples. The reference numeral "520" of FIG. 5 may denote locations of luma samples and chroma samples in a picture in case that the value of chroma_format_idc is 3, that is, in case that the chroma format is 4:4:4, and all the chroma samples may always be present at the same locations as those of the corresponding luma samples.

Meanwhile, in the video/image coding, pictures constituting a video/image may be encoded/decoded in accordance with a series of decoding orders. The picture order corresponding to the output order of the decoded pictures may be configured differently from the decoding order, and based on this, not only forward prediction but also backward prediction may be performed during the inter prediction.

Figure 6:
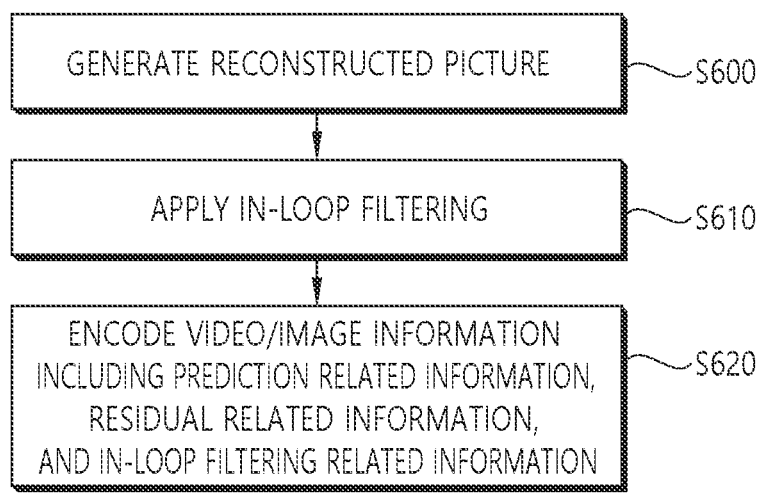
FIGS. 6 and 7 schematically illustrate a video/image encoding method based on in-loop filtering and an example of a filter in an encoding apparatus.
Figure 7:
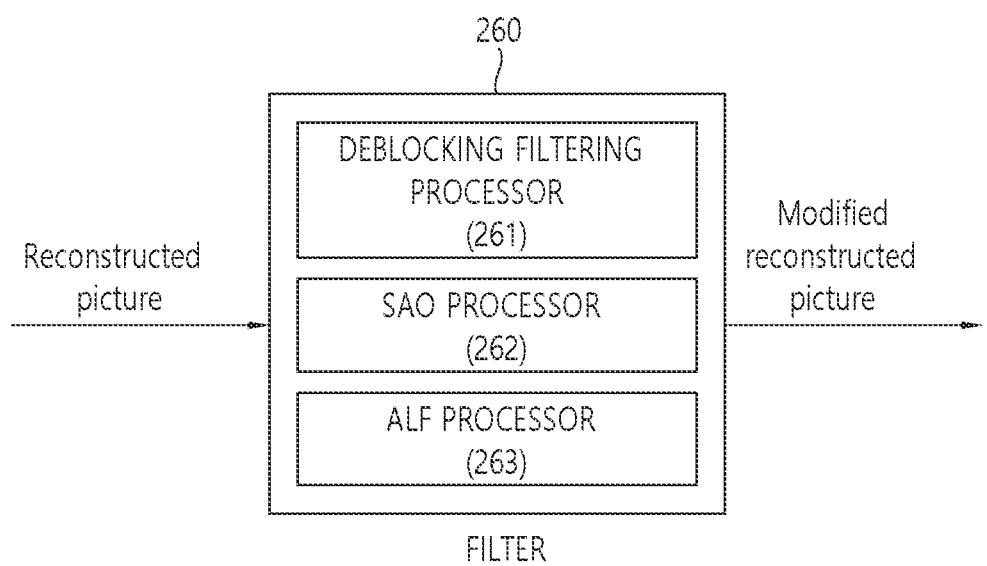

FIGS. 6 and 7 schematically illustrate a video/image encoding method based on in-loop filtering and an example of a filter in an encoding apparatus.

Referring to FIG. 6 and FIG. 7, the encoding apparatus generates a reconstructed picture for the current picture (S600). As described in FIG. 2, the encoding apparatus may generate the reconstructed picture through procedures of partitioning, intra/inter prediction, and residual processing for the input original picture. Specifically, Specifically, the encoding apparatus may generate prediction samples for the current block through intra or inter prediction, generate residual samples based on the prediction samples, and derive (modified) residual samples by performing dequantization/inverse transform of the residual samples again after performing transform/quantization thereof. The reason why the dequantization/inverse transform is performed again after the transform/quantization is to derive the same residual samples as the residual samples derived by the decoding apparatus as described above. This is because the quantization procedure is basically a lossy coding procedure, and the transform procedure also has a loss in case that reduced transform (RT) is applied. The encoding apparatus may generate a reconstructed block including reconstructed samples for the current block based on the prediction samples and the (modified) residual samples. The reconstructed picture may be generated based on the reconstructed block.

The encoding apparatus performs an in-loop filtering procedure for the reconstructed picture (S610). Through the in-loop filtering procedure, the modified reconstructed picture may be generated. As a decoded picture, the modified reconstructed picture may be stored in a decoded picture buffer or a memory 270, and may be used as a reference picture in an inter prediction procedure during the subsequent picture encoding. The in-loop filtering procedure may include at least one of a deblocking filtering procedure, a sample adaptive offset (SAO) procedure, and/or an adaptive loop filter (ALF) procedure. S610 may be performed by a filter 260 of the encoding apparatus. Specifically, for example, the deblocking filtering procedure may be performed by a deblocking filtering processor 261, the SAO procedure may be performed by an SAO processor 262, and the ALF procedure may be performed by an ALF processor 263. In consideration of the image characteristic, complexity, and efficiency, some of the various filtering procedures may be omitted, and in this case, related components in FIG. 7 may also be omitted.

The encoding apparatus may encode image information including information for picture reconstruction and in-loop filtering related information, and may output the encoded image information in the form of a bitstream (S620). The output bitstream may be transferred to the decoding apparatus through a storage medium or a network. S620 may be performed by the entropy encoder 240 of the encoding apparatus. The information for the picture reconstruction may include partitioning information as described above/later, prediction information, and residual information. For example, the in-loop filtering related information may include flag information indicating whether the overall in-loop filtering is applied, flag information indicating whether respective filtering procedures are applied, information on an SAO type, information on an SAO offset value, information on an SAO band location, information on an ALF filtering shape, and/or information on an ALF filtering coefficient. Further, for example, the in-loop filtering related information may include deblocking filtering information. The deblocking filtering information may include information/syntax elements related to deblocking parameters used in a deblocking filtering process. The detailed filtering related information will be described later. In the same manner, as described above, in consideration of the image characteristic, complexity, and efficiency, some of the various filtering procedures may be omitted, and in case that some filtering methods are omitted, information (parameter) related to the omitted filtering may be omitted.

The prediction information may include prediction mode information (e.g., mpm flag, mpm index, merge flag, merge subblock flag, inter affine flag, and the like), and motion information indexes (e.g., merge index, mvp flag (index), merge subblock index, and the like). For example, a motion information candidate list (e.g., merge candidate list, mvp candidate list, or merge subblock candidate list) may be configured based on the prediction mode of the current block, and the motion information index may be used to indicate/select any one of candidates present in the motion information candidate list.

Figure 8:
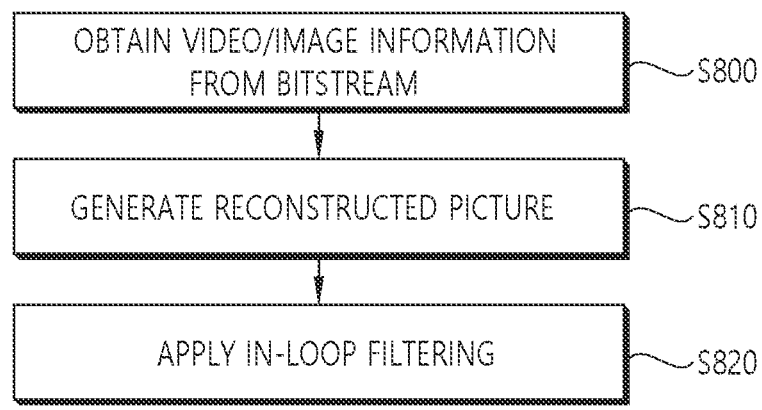
FIGS. 8 and 9 schematically illustrate a video/image decoding method based on in-loop filtering and an example of a filter in a decoding apparatus.
Figure 9:
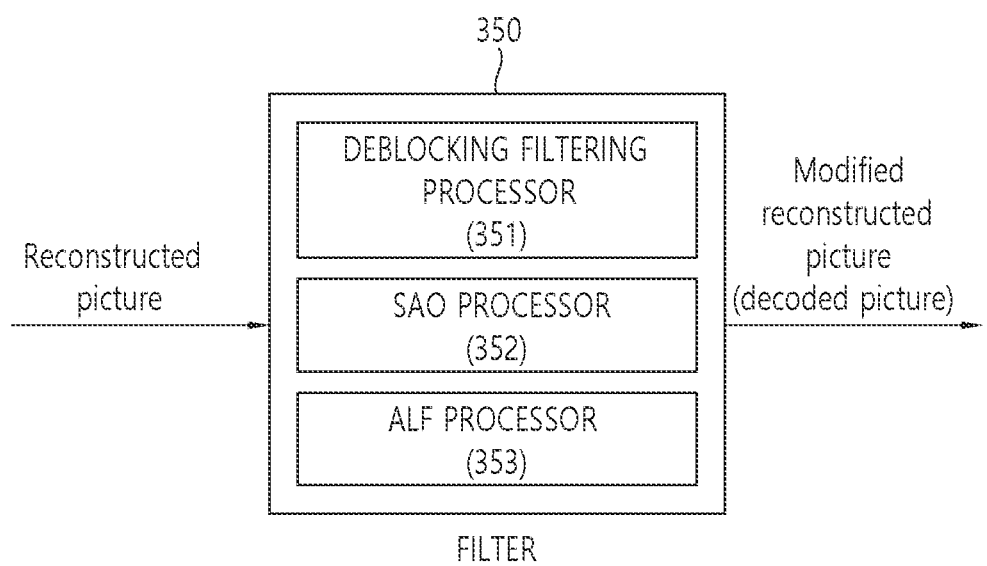

FIGS. 8 and 9 schematically illustrate a video/image decoding method based on in-loop filtering and an example of a filter in a decoding apparatus. The decoding apparatus may perform an operation corresponding to the operation performed by the encoding apparatus.

Referring to FIG. 8 and FIG. 9, the decoding apparatus may obtain image information including information for picture reconstruction and in-loop filtering related information from a received bitstream (S800). S800 may be performed by the entropy decoder 310 of the deciding apparatus. The information for the picture reconstruction may include partitioning information as described above/later, prediction information, and residual information.

For example, the in-loop filtering related information may include flag information indicating whether the overall in-loop filtering is applied, flag information indicating whether respective filtering procedures are applied, information on an SAO type, information on an SAO offset value, information on an SAO band location, information on an ALF filtering shape, information on an ALF filtering coefficient, information on a bilateral filter shape, and/or information on bilateral filter weight value. Further, for example, the in-loop filtering related information may include deblocking filtering information. The deblocking filtering information may include information/syntax elements related to deblocking parameters used in a deblocking filtering process. The detailed filtering related information will be described later. In the same manner, as described above, in consideration of the image characteristic, complexity, and efficiency, some of the various filtering procedures may be omitted, and in case that some filtering methods are omitted, information (parameter) related to the omitted filtering may be omitted.

The prediction information may include prediction mode information (e.g., mpm flag, mpm index, merge flag, merge subblock flag, inter affine flag, and the like), and motion information indexes (e.g., merge index, mvp flag (index), merge subblock index, and the like). For example, a motion information candidate list (e.g., merge candidate list, mvp candidate list, or merge subblock candidate list) may be configured based on the prediction mode of the current block, and the motion information index may be used to indicate/select any one of candidates present in the motion information candidate list.

The decoding apparatus generates a reconstructed picture for the current picture based on the information for the picture reconstruction (S810). As described above in FIG. 3, the decoding apparatus may generate a reconstructed picture through procedures of intra/inter prediction and residual processing for the current picture. Specifically, the decoding apparatus generates prediction samples for the current block through intra or inter prediction based on prediction information included in the information for the picture reconstruction, and derives residual samples for the current block based on residual information included in the information for the picture reconstruction (based on dequantization/inverse transform). The decoding apparatus may generate a reconstructed block including reconstructed samples for the current block based on the prediction samples and the residual samples. The reconstructed picture may be generated based on the reconstructed block.

The decoding apparatus performs an in-loop filtering procedure for the reconstructed picture (S820). Through the in-loop filtering procedure, the modified reconstructed picture may be generated. The modified reconstructed picture may be output as the decoded picture and/or may be stored in a decoded picture buffer or a memory 360, and may be used as a reference picture in the inter prediction procedure during the subsequent picture decoding. The in-loop filtering procedure may include at least one of a deblocking filtering procedure, a sample adaptive offset (SAO) procedure, and/or an adaptive loop filter (ALF) procedure. S820 may be performed by a filter 350 of the decoding apparatus. Specifically, for example, the deblocking filtering procedure may be performed by a deblocking filtering processor 351, the SAO procedure may be performed by an SAO processor 352, and the ALF procedure may be performed by an ALF processor 353. In the same manner, in consideration of the image characteristic, complexity, and efficiency as described above, some of the various filtering procedures may be omitted, and in this case, related components in FIG. 9 may also be omitted.

That is, the decoding apparatus may apply an in-loop filter based on the in-loop filtering related information. For example, deblocking parameters for performing deblocking filtering may be derived based on deblocking filtering information (information/syntax element related to the deblocking parameters). The deblocking filtering may be applied to the reconstructed picture or a target boundary of the reconstructed picture based on the deblocking parameters.

It is possible to reduce noises generated upon coding the image/the video, such as blocking artifact and ringing artifact by the in-loop filtering procedure, and to enhance subjective/objective visual qualities. Further, by performing the in-loop filtering procedure both in the encoding apparatus and the decoding apparatus, the encoding apparatus and the decoding apparatus may derive the same prediction results, increase reliability of the picture coding, and reduce an amount of data to be transmitted for coding the picture.

Specifically, the deblocking filtering is a filtering technique to remove distortion generated on a boundary between blocks from the reconstructed picture. For example, the deblocking filtering procedure may derive a target boundary from the reconstructed picture, determine boundary strength (bS) for the target boundary, and perform the deblocking filtering for the target boundary based on the bS. The bS may be determined based on a prediction mode of two blocks adjacent to the target boundary, a motion vector difference, whether reference pictures are the same, and whether an effective coefficient that is not 0 is present.

The SAO is a method for compensating for an offset difference between the reconstructed picture and the original picture in the unit of a sample, and may be applied based on, for example, types of band offset and edge offset. According to the SAO, samples may be classified into different categories in accordance with respective SAO types, and offset values may be added to the respective samples based on the categories. Filtering information for the SAO may include information on whether the SAO is applied, SAO type information, and SAO offset value information. The SAO may be applied to the reconstructed picture after the deblocking filtering is applied.

An adaptive loop filter (ALF) is a technique to filter the reconstructed picture in the unit of a sample based on filter coefficients according to the filter shape. The encoding apparatus may determine whether to apply the ALF, ALF shape, and/or ALF filtering coefficient through comparison of the reconstructed picture with the original picture, and may signal them to the decoding apparatus. That is, the filtering information for the ALF may include information on whether ALF is applied, ALF filter shape information, ALF filtering coefficient information. The ALF may also be applied to the reconstructed picture after the deblocking filtering is applied.

Figure 10:
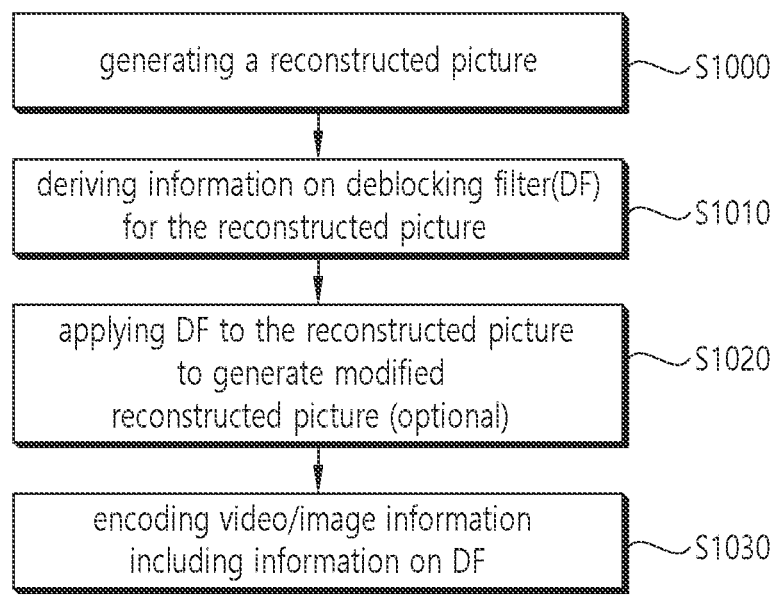
FIG. 10 schematically illustrates an example of a deblocking filtering process.

FIG. 10 schematically illustrates an exemplary embodiment of the deblocking filter process. The process of FIG. 10 may be performed by the filter 260 in the encoding apparatus illustrated in FIG. 2 and the filter 350 in the decoding apparatus illustrated in FIG. 3.

Referring to FIG. 10, the encoding apparatus/the decoding apparatus may derive the boundary between the blocks on which the deblocking filtering is performed in the reconstructed picture (S1000). Meanwhile, the boundary on which the deblocking filtering is performed may be referred to as an edge. Further, the boundary on which the deblocking filtering is performed may include two types, and the two types may be a vertical boundary and a horizontal boundary. The vertical boundary may be referred to as a vertical edge, and the horizontal boundary may be referred to as a horizontal edge. The encoding apparatus/the decoding apparatus may perform the deblocking filtering for the vertical edge, and perform the deblocking filtering for the horizontal edge.

When performing the deblocking filtering for one direction (i.e., the deblocking filtering for the vertical boundary or the deblocking filtering for the horizontal boundary), the encoding apparatus/the decoding apparatus may derive a transform block boundary. The encoding apparatus/the decoding apparatus may derive a coding subblock boundary.

The encoding apparatus/the decoding apparatus may derive the block boundary on which the deblocking filtering is performed based on a grid of an N×N size. For example, the encoding apparatus/the decoding apparatus may derive the block boundary on which the deblocking filtering is performed based on whether the boundary of the block (the transform block or the coding subblock) corresponds to the grid of the N×N size. In other words, for example, the encoding apparatus/the decoding apparatus may derive the block boundary on which the deblocking filtering is performed based on whether the boundary of the block (the transform block or the coding subblock) is the block boundary positioned on the grid of the N×N size. The encoding apparatus/the decoding apparatus may derive the boundary of the block corresponding to the grid of the N×N size as the block boundary on which the deblocking filtering is performed. Here, the grid of the N×N size may mean a boundary derived by splitting the reconstructed picture into a square of the N×N size. The grid of the N×N size may be, for example, a grid of a 4×4 or 8×8 size.

The encoding apparatus/the decoding apparatus may determine the boundary strength (bs) of the boundary on which the deblocking filtering is performed (S1010). The bs may also be referred to as a boundary filtering strength.

The encoding apparatus/the decoding apparatus may determine the bs based on the blocks adjacent to the boundary on which the deblocking filtering is performed. For example, a case of obtaining the bs value of the boundary (block edge) between a block P and a block Q may be assumed. In this case, the encoding apparatus/the decoding apparatus may determine the bs value of the boundary based on information about positions of the block P and the block Q and/or whether the block P and the block Q are coded in the intra mode.

Here, the block P may represent a block including a p0 sample adjacent to the boundary on which the deblocking filtering is performed, and the block Q may represent a block including a q0 sample adjacent to the boundary on which the deblocking filtering is performed.

For example, the p0 may represent a sample of a block adjacent to a left or a top of the boundary on which the deblocking filtering is performed, and the q0 may represent a sample of a block adjacent to a right or a bottom of the boundary on which the deblocking filtering is performed. As an example, if a direction of the filtering boundary is a vertical direction (i.e., if the filtering boundary is the vertical boundary), the p0 may represent the sample of the block adjacent to the left of the boundary on which the deblocking filtering is performed, and the q0 may represent the sample of the block adjacent to the right of the boundary on which the deblocking filtering is performed. Alternatively, as another example, if the direction of the filtering boundary is a horizontal direction (i.e., if the filtering boundary is the horizontal boundary), the p0 may represent the sample of the block adjacent to the top of the boundary on which the deblocking filtering is performed, and the q0 may represent the sample of the block adjacent to the bottom of the boundary on which the deblocking filtering is performed.

The encoding apparatus/the decoding apparatus may derive deblocking parameters (S1020). The deblocking parameters may include parameters related to beta and tc. The beta value and the tc value may be derived based on information related to the deblocking filter disclosed in the present document. That is, the beta value and the tc value may be chroma component filter parameter information to be described later.

The encoding apparatus/the decoding apparatus may perform the deblocking filtering based on the bS and the deblocking parameters (S1030). The deblocking parameters may represent deblocking filter coefficients. The deblocking filtering may be performed based on the deblocking filter coefficients. That is, S1030 may include a step of deriving the deblocking filter coefficients based on the deblocking parameters and applying the deblocking filter to the target boundary of the reconstructed samples based on the deblocking filter coefficients. The deblocking filtering may be performed in case that the bS is larger than 0. Specifically, if the bS is 1, the deblocking filtering for a luma component may be performed, whereas if the bS is 2, the deblocking filtering for the luma component and chroma component may be performed.

The encoding apparatus/the decoding apparatus may perform the deblocking filtering based on the bs. For example, the encoding apparatus/the decoding apparatus may determine whether the filtering process for all block boundaries in the reconstructed picture is performed, and if the filtering process for all block boundaries is not performed, the encoding apparatus/the decoding apparatus may determine whether the position of the boundary of the subblock corresponds to the grid of the N×N size (e.g., 8×8 grid). For example, it may be determined whether a remainder derived by dividing the x component and the y component of the boundary position of the subblock by an N is 0. If the remainder derived by dividing the x component and the y component of the position of the boundary of the subblock by the N is 0, the position of the boundary of the subblock may correspond to the grid of the N×N size. If the position of the boundary of the subblock corresponds to the grid of the N×N size, the encoding apparatus/the decoding apparatus may perform the deblocking filtering on the boundary based on the bs of the boundary and the deblocking parameters.

At this time, based on the determined bs value, a filter being applied to the boundary between the blocks may be determined. The filter may be divided into a strong filter and a weak filter. The encoding apparatus/the decoding apparatus may perform the filtering for a boundary at a position at which the block distortion is highly likely to occur in the reconstructed picture and a boundary at a position at which the block distortion is less likely to occur therein with different filters, thereby enhancing coding efficiency.

The encoding apparatus/the decoding apparatus may perform the deblocking filtering on the boundary between the blocks using the determined filter (e.g., the strong filter or the weak filter). If the deblocking filtering processes for all of the boundaries between the blocks in the reconstructed picture are performed, the deblocking filtering process may be terminated.

In relation to this, according to one existing embodiment, a picture parameter set (PPS) may include syntax of Table 2 below. The syntax of Table 2 below may be a part of the PPS.

TABLE 2

| pic_parameter_set_rbsp( ) { | Descriptor |
|---|---|
| ... | ue(v) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cb_tc_offset_div2 | se(v) |
| } | |
| ... | |

Here, semantics of a syntax element included in the syntax of Table 2 above may be represented, for example, as in Table 3 below.

TABLE 3 pps_cb_beta_offset_div2 and pps_cb_tc_offset_div2 specify the default deblocking parameter offsets for β and tC (divided by 2) that are applied to the Cb component for the slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.
pps_cr_beta_offset_div2 and pps_cr_tc_offset_div2 specify the default deblocking parameter offsets for β and tC (divided by 2) that are applied to the Cr component for the slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

The image information obtained through the bitstream may include information related to the deblocking filter, and the information related to the deblocking filter may include a first deblocking filter disabled flag, first luma component filter parameter information, and first chroma component filter parameter information.

Here, the first deblocking filter disabled flag may be related to whether the deblocking filter is not enabled for the pictures referring to the PPS. That is, the fi9rst deblocking filter disabled flag may indicate/represent whether the deblocking filter is not enabled for the pictures referring to the PPS.

For example, the first deblocking filter disabled flag may be represented in the form of a pps_deblocking_filter_disabled_flag syntax element. For example, the pps_deblocking_filter_disabled_flag syntax element may specify whether the deblocking filter is not enabled for the picture referring to the PPS.

The first luma component filter parameter information may be related to deblocking parameter offsets being applied to luma components of slices referring to the PPS. That is, the first luma component filter parameter information may indicate/represent the deblocking parameter offsets being applied to the luma components of the slices referring to the PPS.

For example, the first luma component filter parameter information may be represented in the form of a pps_beta_offset_div2 syntax element and a pps_tc_offset_div2 syntax element. For example, the pps_beta_offset_div2 syntax element and the pps_tc_offset_div2 syntax element may specify the deblocking parameter offsets being applied to the luma components of the slices referring to the PPS.

The first chroma component filter parameter information may be related to deblocking parameter offsets being applied to chroma components of the slices referring to the PPS. That is, the first chroma component filter parameter information may indicate/represent the deblocking parameter offsets being applied to the chroma components of the slices referring to the PPS.

For example, the first chroma component filter parameter information may be represented in the form of a pps_cb_beta_offset_div2 syntax element, a pps_cb_tc_offset_div2 syntax element, a pps_cr_beta_offset_div2 syntax element, or a pps_cr_tc_offset_div2 syntax element. For example, the pps_cb_beta_offset_div2 syntax element, the pps_cb_tc_offset_div2 syntax element, the pps_cr_beta_offset_div2 syntax element, and the pps_cr_tc_offset_div2 syntax element may specify the deblocking parameter offsets being applied to the chroma components of the slices referring to the PPS.

According to the one existing embodiment, if the value of the first deblocking filter disabled flag is 0, the first luma component filter parameter information and the first chroma component filter parameter information may be configured/included in the PPS. If the value of the first deblocking filter disabled flag is 1, the first luma component filter parameter information and the first chroma component filter parameter information may not be present. In case that the first luma component filter parameter information and the first chroma component filter parameter information are not present, the first luma component filter parameter information and the first chroma component filter parameter information may have the value of 0, respectively.

According to the one existing embodiment, a picture header (PH) may include syntax of Table 4 below. The syntax of Table 4 below may be a part of the PH.

TABLE 4

| picture_header_structure( ) { | Descriptor |
|---|---|
| ... | ue(v) |
| if( ph_deblocking_filter_override_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| ... | |

Here, semantics of a syntax element included in the syntax of Table 4 above may be represented, for example, as in Table 5 below.

TABLE 5 ph_cb_beta_offset_div2 and ph_cb_tc_offset_div2 specify the deblocking parameter offsets for β and tC (divided by 2) that are applied to the Cb component for the slices associated with th PH. The values of ph_cb_beta_offset_div2 and ph_cb_tc_offset_div2 shall both be in the range of −12 to 12, inclusive, When not present, the values of ph_cb_beta_offset_div2 and ph_cb_tc_offset_div2 are inferred to be equal to pps_cb_beta_offset_div2 and pps_cb_tc_offset_div2, respectively.
ph_cr_beta_offset_div2 and ph_cr_tc_offset_div2 specify the deblocking parameter offsets for β and tC (divided by 2) that are applied to the Cr component for the slices associated with th PH. The values of ph_cr_beta_offset_div2 and ph_cr_tc_offset_div2 shall both be in the range of −12 to 12, inclusive, When not present, the values of ph_cr_beta_offset_div2 and ph_cr_tc_offset_div2 are inferred to be equal to pps_cr_beta_offset_div2 and pps_cr_tc_offset_div2, respectively.

The information related to the deblocking filter may include a second deblocking filter override flag, a second deblocking filter disabled flag, second luma component filter parameter information, and second chroma component filter parameter information.

Here, the second deblocking filter override flag may be related to whether the deblocking parameter is present in the PH. That is, the second deblocking filter override flag may indicate/represent whether the deblocking parameter is present in the PH.

For example, the second deblocking filter override flag may be represented in the form of a ph_deblocking_filter_override_flag syntax element. For example, the ph_deblocking_filter_override_flag syntax element may specify whether the deblocking parameter is present in the PH.

The second deblocking filter disabled flag may be related to whether the deblocking filter is not enabled for slices of the current picture. That is, the second deblocking filter disabled flag may indicate/represent whether the deblocking filter is not enabled for the slices of the current picture.

For example, the second deblocking filter disabled flag may be represented in the form of a ph_deblocking_filter_disabled_flag syntax element. For example, the ph_deblocking_filter_disabled_flag syntax element may specify whether the deblocking filter is not enabled for the slices of the current picture.

The second luma component filter parameter information may be related to the deblocking parameter offsets being applied to the luma components of the slices in the current picture. That is, the second luma component filter parameter information may indicate/represent the deblocking parameter offsets being applied to the luma components of the slices in the current picture.

For example, the second luma component filter parameter information may be represented in the form of a ph_beta_offset_div2 syntax element or a ph_tc_offset_div2 syntax element. For example, the ph_beta_offset_div2 syntax element and the ph_tc_offset_div2 syntax element may specify the deblocking parameter offsets being applied to the luma components of the slices in the current picture.

The second chroma component filter parameter information may be related to the deblocking parameter offsets being applied to the chroma components of the slices in the current picture. That is, the second chroma component filter parameter information may indicate/represent the deblocking parameter offsets being applied to the chroma components of the slices in the current picture.

For example, the second chroma component filter parameter information may be represented in the form of a ph_cb_beta_offset_div2 syntax element, a phcb_tc_offset_div2 syntax element, a ph_cr_beta_offset_div2 syntax element, or a ph_cr_tc_offset_div2 syntax element. For example, the ph_cb_beta_offset_div2 syntax element, the ph_cb_tc_offset_div2 syntax element, the ph_cr_beta_offset_div2 syntax element, or the ph_cr_tc_offset_div2 syntax element may specify the deblocking parameter offsets being applied to the chroma components of the slices in the current picture.

According to the one existing embodiment, if the value of the second deblocking filter override flag is 1, the second deblocking filter disabled flag may be configured/included in the PH. If the value of the second deblocking filter override flag is 0, the second deblocking filter disabled flag may not be present. If the second deblocking filter disabled flag is not present, the value of the second deblocking filter disabled flag may be 0.

In this case, according to the one embodiment, if the value of the second deblocking filter disabled flag is 0, the second luma component filter parameter information and the second chroma component filter parameter information may be configured/included in the PH. If the value of the second deblocking filter disabled flag is 1, the second luma component filter parameter information and the second chroma component filter parameter information may not be present. If the second chroma component filter parameter information is not present, the second chroma component filter parameter information may have the same value as the value of the first chroma component filter parameter information under certain conditions.

According to the one existing embodiment, a slice header (SH) may include syntax of Table 6 below. The syntax of Table 6 below may be a part of the SH.

TABLE 6

| slice_header( ) { | Descriptor |
|---|---|
| ... | ue(v) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } | |
|   } | |
| ... | |

Here, semantics of a syntax element included in the syntax of Table 6 above may be represented, for example, as in Table 7 below.

TABLE 7 slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.
slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

The information related to the deblocking filter may include a third deblocking filter override flag, a third deblocking filter disabled flag, third luma component filter parameter information, and third chroma component filter parameter information.

Here, the third deblocking filter override flag may be related to whether the deblocking parameter is present in the SH. That is, the third deblocking filter override flag may indicate/represent whether the deblocking parameter is present in the SH.

For example, the third deblocking filter override flag may be represented in the form of a slice_deblocking_filter_override_flag syntax element. For example, the slice_deblocking_filter_override_flag syntax element may specify whether the deblocking parameter is present in the SH.

The third deblocking filter disabled flag may be related to whether the deblocking filter is not enabled for the current slice. That is, the third deblocking filter disabled flag may indicate/represent whether the deblocking filter is not enabled for the current slice.

For example, the third deblocking filter disabled flag may be represented in the form of a slice_deblocking_filter_disabled_flag syntax element. For example, the slice_deblocking_filter_disabled_flag syntax element may specify whether the deblocking filter is not enabled for the current slice.

The third luma component filter parameter information may be related to the deblocking parameter offsets being applied to the luma component of the current slice. That is, the third luma component filter parameter information may indicate/represent the deblocking parameter offsets being applied to the luma component of the current slice.

For example, the third luma component filter parameter information may be represented in the form of a slice_beta_offset_div2 syntax element or a slice_tc_offset_div2 syntax element. For example, the slice_beta_offset_div2 syntax element and the slice_tc_offset_div2 syntax element may specify the deblocking parameter offsets being applied to the luma component of the current slice.

The third chroma component filter parameter information may be related to the deblocking parameter offsets being applied to the chroma components of the current slice. That is, the third chroma component filter parameter information may indicate/represent the deblocking parameter offsets being applied to the chroma components of the current slice.

For example, the third chroma component filter parameter information may be represented in the form of a slice_cb_beta_offset_div2 syntax element, a slice_cb_tc_offset_div2 syntax element, a slice_cr_beta_offset_div2 syntax element, or a slice_cr_tc_offset_div2 syntax element. For example, the slice_cb_beta_offset_div2 syntax element, the slice_cb_tc_offset_div2 syntax element, the slice_cr_beta_offset_div2 syntax element, or the slice_cr_tc_offset_div2 syntax element may specify the deblocking parameter offsets being applied to the chroma components of the current slice.

According to the one existing embodiment, if the value of the third deblocking filter override flag is 1, the third deblocking filter disabled flag may be configured/included in the SH. If the value of the third deblocking filter override flag is 0, the third deblocking filter disabled flag may not be present. If the third deblocking filter disabled flag is not present, the value of the third deblocking filter disabled flag may be 0.

In this case, according to the one embodiment, if the value of the third deblocking filter disabled flag is 0, the third luma component filter parameter information and the third chroma component filter parameter information may be configured/included in the SH. If the value of the third deblocking filter disabled flag is 1, the third luma component filter parameter information and the third chroma component filter parameter information may not be present. If the third chroma component filter parameter information is not present, the third chroma component filter parameter information may have the same value as the value of the second chroma component filter parameter information under certain conditions.

That is, according to the one existing embodiment, in encoding/decoding information related to the deblocking filter in order to perform the deblocking filtering, the chroma component filter parameter information related to the deblocking parameter offsets being applied to the chroma components is always signaled/parsed under certain conditions at the respective levels of the PPS, the PH, and the SH.

However, in case of a monochrome image (black and white image), the chroma component filter parameter information is information that is unnecessary in performing the deblocking filtering, and thus the chroma component filter parameter information is not necessary to be signaled/parsed. Accordingly, embodiments of the present document propose a method for efficiently encoding/decoding the chroma component filter parameter information for the monochrome image. In this case, the embodiments of the present document may be combined with each other.

According to an embodiment proposed in the present document, the information related to the deblocking filter may be signaled at the PH level as follows.

According to the embodiment, the PH may include syntax as in Table 8 below. The syntax in Table 8 below may be a part of the PH.

TABLE 8

| | Descriptor |
|---|---|
| picture_header_structure( ) { | |
| ... | |
|   if( ph_deblocking_filter_override_flag ) { | ue (v) |

TABLE 8-continued

| | Descriptor |
|---|---|
| ph_deblocking_filter_disabled_flag | u (1) |
| if( !ph_deblocking_filter_disabled_flag) { | |
| ph_beta_offset_div2 | se (v) |
| ph_tc_offset_div2 | se (v) |
| if( ChromaArrayType != 0 ) { | |

TABLE 8-continued

| | Descriptor |
|---|---|
| ph_cb_beta_offset_div2 | se (v) |
| ph_cb_tc_offset_div2 | se (v) |
| ph_cr_beta_offset_div2 | se (v) |
| ph_cr_tc_offset_div2 | se (v) |
| } | |
| } | |
| } | |
| ... | |

Here, semantics of a syntax element included in syntax of Table 8 above may be represented, for example, as in Table 5 above.

According to the one embodiment, like the one existing embodiment, if the value of the second deblocking filter disabled flag is 0, the second luma component filter parameter information and the second chroma component filter parameter information may be configured/included in the PH. If the value of the second deblocking filter disabled flag is 1, the second luma component filter parameter information and the second chroma component filter parameter information may not be present. If the second chroma component filter parameter information is not present, the second chroma component filter parameter information may have the same value as the value of the first chroma component filter parameter information under certain conditions.

In this case, the encoding apparatus/the decoding apparatus may derive a variable ChromaArrayType (chroma array type) related to the sampling format of the chroma components based on the chroma_format_idc syntax element and the separate_colour_plane_flag syntax element of Table 1 above. As an example, the ChromaArrayType may have the value of 0 in case that the chroma format is the monochrome, may have the value of 1 in case that the chroma format is 4:2:0, may have the value of 2 in case that the chroma format is 4:2:2, and may have the value of 3 or 0 in case that the chroma format is 4:4:4.

That is, according to the one embodiment, if the value of the ChromaArrayType is not 0, the second chroma component filter parameter information may be configured/included in the PH. If the value of the ChromaArrayType is 0, the second chroma component filter parameter information may not be present.

Further, according to another embodiment, the PH may include the syntax of Table 4 above, and semantics of a syntax element included in the syntax of Table 4 above may be represented, for example, as in Table 9 below.

TABLE 9 ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively. When ChromaArrayType is equal to 0, the value of ph_cb_beta_offset_div2 and ph_cb_tc_offset_div2 shall be equal to 0.
ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_bets_offset_div2 and ph_cr_tc_offset_div2 are inferred to be equal to pps_cr_beta_offset_div2 and pps_cr_tc_offset_div2, respectively. When ChromaArrayType is equal to 0, the value of ph cr beta offset div2 and ph cr tc offset div2 shall be equal to 0.

That is, if the value of the second deblocking filter disabled flag is 0, the second luma component filter parameter information and the second chroma component filter parameter information may be configured/included in the PH, and according to the one embodiment, if the value of the ChromaArrayType is 0, the value of the second chroma component filter parameter information may be limited to 0.

Further, according to another embodiment, the PH may include syntax of Table 10 below. The syntax of Table 10 below may be a part of the PH.

TABLE 10

| | Descriptor |
|---|---|
| picture_header_structure( ) { | |
| ... | ue (v) |
| if( ph_deblocking_filter_override_flag) { | |
| ph_deblocking_filter_disabled_flag | u (1) |
| if( !ph_deblocking_filter_disabled_flag) { | |
| ph_beta_offset_div2 | se (v) |
| ph_tc_offset_div2 | se (v) |
| if(pps_chroma_tool_offsets_present_flag) { | |
| ph_cb_beta_offset_div2 | se (v) |
| ph_cb_tc_offset_div2 | se (v) |
| ph_cr_beta_offset_div2 | se (v) |
| ph_cr_tc_offset_div2 | se (v) |
| } | |
| } | |
| } | |
| ... | |

Here, semantics of a syntax element included in the syntax of Table 10 above may be represented, for example, as in Table 5 or Table 9 above.

The information related to the deblocking filter may include the second deblocking filter override flag, the second deblocking filter disabled flag, the second luma component filter parameter information, the second chroma component filter parameter information, and a chroma tool offset present flag.

Here, the chroma tool offset present flag may be related to whether chroma tool offset related information is present in the PPS, and whether chroma deblocking parameter offset information is present in the PH or the SH referring to the PPS. That is, the chroma tool offset present flag may be related to whether the chroma component filter parameter information is present. That is, the chroma tool offset present flag may indicate/represent whether the chroma component filter parameter information is present.

For example, the chroma tool offset present flag may be represented in the form of a pps_chroma_tool_offsets_present flag syntax element. For example, the pps_chroma_tool_offsets_present flag syntax element may specify whether the chroma component filter parameter information is present.

According to the one embodiment, like the one existing embodiment, if the value of the second deblocking filter override flag is 1, the second deblocking filter disabled flag may be configured/included in the PH. If the value of the second deblocking filter override flag is 0, the second deblocking filter disabled flag may not be present. If the second deblocking filter disabled flag is not present, the value of the second deblocking filter disabled flag may be 0.

In this case, according to the one embodiment, if the value of the second deblocking filter disabled flag is 0, the second luma component filter parameter information and the second chroma component filter parameter information may be configured/included in the PH.

In this case, according to the one embodiment, if the value of the chroma tool offset present flag is 1, the second chroma component filter parameter information may be configured/included in the PH. If the value of the chroma tool offset present flag is 0, the second chroma component filter parameter information may not be present.

Here, semantics of a syntax element included in the syntax of Table 11 above may be represented, for example, as in Table 7 above.

According to the one embodiment, like the one existing embodiment, if the value of the third deblocking filter disabled flag is 0, the third luma component filter parameter information and the third chroma component filter parameter information may be configured/included in the SH. If the value of the third deblocking filter disabled flag is 1, the third luma component filter parameter information and the third chroma component filter parameter information may not be present. If the third chroma component filter parameter information is not present, the third chroma component filter parameter information may have the same value as the value of the second chroma component filter parameter information under certain conditions.

In this case, according to the one embodiment, if the value of the ChromaArrayType is not 0, the third chroma component filter parameter information may be configured/included in the SH. If the value of the ChromaArrayType is 0, the third chroma component filter parameter information may not be present.

Further, according to the one embodiment, the SH may include the syntax of Table 6 above, and semantics of a syntax element included in the syntax of Table 6 above may be represented, for example, as in Table 12 below.

TABLE 12 slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively. When ChromaArrayType is equal to 0, the value of slice_cb_beta_offset_div2 and slice_cb_tc_offset_div2 shall be equal to 0.
slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_bets_offset_div2 and slice_cr_tc_offset_div2 are inferred to be equal to ph_cr_beta_offset_div2 and ph_cr_tc_offset_div2, respectively. When ChromaArrayType is equal to 0, the value of slice_cr_beta_offset_div2 and slice cr tc offset div2 shall be equal to 0.

According to an embodiment proposed in the present document, the deblocking filter related information may be signaled at the SH level as follows.

According to the one embodiment, the SH may include a syntax of Table 11 below. The syntax of Table 11 below may be a part of the SH.

TABLE 11

| | Descriptor |
|---|---|
| slice_header( ) { | |
| ... | |
|   if( slice_deblocking_filter_override_flag) { | ue (v) |
|     slice_deblocking_filter_disabled_flag | u (1) |
|     if( !slice_deblocking_filter_disabled_flag) { | |
|       slice_beta_offset_div2 | se (v) |
|       slice_tc_offset_div2 | se (v) |
|       if( ChromaArrayType != 0 ) { | |
|         slice_cb_beta_offset_div2 | se (v) |
|         slice_cb_tc_offset_div2 | se (v) |
|         slice_cr_beta_offset_div2 | se (v) |
|         slice_cr_tc_offset_div2 | se (v) |
|       } | |
|     } | |
|   } | |
| ... | |

That is, if the value of the third deblocking filter disabled flag is 0, the third luma component filter parameter information and the third chroma component filter parameter information may be configured/included in the SH, and according to the one embodiment, if the value of the ChromaArrayType is 0, the value of the third chroma component filter parameter information may be limited to 0.

Further, according to another embodiment, the SH may include a syntax of Table 13 below. The syntax of Table 13 below may be a part of the SH.

TABLE 13

| | Descriptor |
|---|---|
| slice_header( ) { | |
| ... | ue (v) |
|   if( slice_deblocking_filter_override_flag) { | |
|     slice_deblocking_filter_disabled_flag | u (1) |
|     if( !slice_deblocking_filter_disabled_flag) { | |
|       slice_beta_offset_div2 | se (v) |
|       slice_tc_offset_div2 | se (v) |
|       if(pps_chroma_tool_offsets_present_flag) { | |

TABLE 13-continued

| | Descriptor |
|---|---|
| slice_cb_beta_offset_div2 | se (v) |
| slice_cb_tc_offset_div2 | se (v) |
| slice_cr_beta_offset_div2 | se (v) |
| slice_cr_tc_offset_div2 | se (v) |
| } | |
| } | |
| } | |
| ... | |

Here, semantics of a syntax element included in the syntax of Table 13 above may be represented, for example, as in Table 7 or Table 12 above.

The information related to the deblocking filter may include the third deblocking filter override flag, the third deblocking filter disabled flag, the third luma component filter parameter information, the third chroma component filter parameter information, and the chroma tool offset present flag.

According to the one embodiment, like the one existing embodiment, if the value of the third deblocking filter override flag is 1, the third deblocking filter disabled flag may be configured/included in the SH. If the value of the third deblocking filter override flag is 0, the third deblocking filter disabled flag may not be present. If the third deblocking filter disabled flag is not present, the value of the third deblocking filter disabled flag may be 0.

In this case, according to the one embodiment, if the value of the third deblocking filter disabled flag is 0, the third luma component filter parameter information and the third chroma component filter parameter information may be configured/included in the SH.

In this case, according to the one embodiment, if the value of the chroma tool offset present flag is 1, the third chroma component filter parameter information may be configured/included in the SH. If the value of the chroma tool offset present flag is 0, the third chroma component filter parameter information may not be present.

According to another embodiment proposed in the present document, the deblocking filter related information may be signaled at the PPS level as follows. According to the above-described embodiments, at the PH level or the SH level, in case of the monochrome image, it is possible to determine whether to transmit the information related to the deblocking filter being applied to the chroma components through the ChromaArrayType, but at the PPS level, it is not possible to derive the value of the ChromaArrayType for the current picture, so that the embodiment for determining whether to transmit the information through the ChromaArrayType is unable to be proposed.

Meanwhile, according to the one embodiment, the PPS may include syntax of Table 14 below. The syntax of Table 14 below may be a part of the PPS.

TABLE 14

| | Descriptor |
|---|---|
| pic_parameter_set_rbsp( ) { | |
| ... | |
|   init_qp_minus26 | se (v) |
|   cu_qp_delta_enabled_flag | u (1) |
|   deblocking_filter_control_present_flag | u (1) |
|   if( deblocking_filter_control_present_flag ) { | |
|     deblocking_filter_override_enabled_flag | u (1) |
|     pps_deblocking_filter_disabled_flag | u (1) |
|     if( !pps_deblocking_filter_disabled_flag ) { | |
|       pps_beta_offset_div2 | se (v) |
|       pps_tc_offset_div2 | se (v) |
|     } | |
|   } | |
|   pps_chroma_tool_offsets_present_flag | u (1) |
|   if( pps_chroma_tool_offsets_present_flag ) { | |
|     pps_cb_qp_offset | se (v) |
|     pps_cr_qp_offset | se (v) |
|     pps_joint_cbcr_qp_offset_present_flag | u (1) |
|     if( pps_joint_cbcr_qp_offset_present_flag ) | |
|       pps_joint_cbcr_qp_offset_value | se (v) |
|     pps_slice_chroma_qp_offsets_present_flag | u (1) |
|     pps_cu_chroma_qp_offset_list_enabled_flag | u (1) |
|     if( deblocking_filter_control_present_flag && !pps_deblocking_filter_disabled_flag ) { | |
|       pps_cb_beta_offset_div2 | se (v) |
|       pps_cb_tc_offset_div2 | se (v) |
|       pps_cr_beta_offset_div2 | se (v) |
|       pps_cr_tc_offset_div2 | se (v) |
|     } | |
|   } | |
|   if( pps_cu_chroma_qp_offset_list_enabled_flag ) { | |
|   ... | |
|   pps_weighted_pred_flag | u (1) |
|   pps_weighted_bipred_flag | u (1) |
|   rpl_info_in_ph_flag | u (1) |
| ... | |

Here, semantics of a syntax element included in the syntax of Table 14 above may be represented, for example, as in Table 15 below.

TABLE 15 pps_chroma_tool_offsets_present_flag equal to 1 specifies that chroma tool offsets related syntax elements are present in the PPS RBSP syntax structure and the chroma deblocking tc and β offset syntax elements could be present in the PH syntax structures or the SHs of pictures referring to the PPS.
pps_chroma_tool_offsets_present_flag equal to 0 specifies that chroma tool offsets related syntax elements are not present in the PPS RBSP syntax structure and the chroma deblocking tc and β offset syntax elements are not present in the PH syntax structures or the SHs of pictures referring to 120 Rec. ITU-T H.266 (08/2020) the PPS.
When sps_chroma_format_idc is equal to 0, the value pps_chroma_tool_offsets_present_flag shall be equal to 0.
deblocking_filter_control_present_flag equal to 1 specifies the presence of deblocking filter control syntax elements in the PPS. pps_deblocking_filter_control_present_flag equal to 0 specifies the absence of deblocking filter control syntax elements in the PPS and that the deblocking filter is applied for all slices referring to the PPS, using 0-valued deblocking β and tC offsets.
deblocking_filter_override_enabled_flag equal to 1 specifies that the deblocking behaviour for pictures referring to the PPS could be overriden in the picture level or slice level.
pps_deblocking_filter_overried_enabled_flag equal to 0 specifies that the deblocking behaviour for pictures referring to the PPS is not overridden in the picture level or slice level. When not present, the value of pps_deblocking_filter_override_enabled_flag is inferred to be equal to 0.
pps_deblocking_filter_disabled_flag equal to 1 specifies that the deblocking filter is disabled for pictures referring to the PPS unless overridden for a picture or slice by information present the PH or SH, respectively.
pps_deblocking_filter_disabled_flag equal to 0 specifies that the deblocking filter is enabled for pictures referring to the PPS unless overridden for a picture or slice by information present the PH or SH, respectively. When not present, the value of pps_deblocking_filter_disabled_flag is inferred to be equal to 0.

The information related to the deblocking filter may include a deblocking filter control present flag, a deblocking filter override enabled flag, the first deblocking filter disabled flag, the first luma component filter parameter information, and the first chroma component filter parameter information.

Here, the deblocking filter control present flag may be related to whether deblocking filter control information is present. That is, the deblocking filter control present flag may indicate/represent whether the deblocking filter control information is present.

For example, the deblocking filter control present flag may be represented in the form of a deblocking_filter_control_present_flag syntax element. For example, the deblocking_filter_control_present_flag syntax element may specify whether the deblocking filter control information is present.

The deblocking filter override enabled flag may be related to whether a deblocking operation for pictures referring to the PPS is redefined at a picture level or a slice level. That is, the deblocking filter override enabled flag may indicate/represent whether the deblocking operation for the pictures referring to the PPS is redefined at the picture level or the slice level.

For example, the deblocking filter override enabled flag may be represented in the form of a deblocking_filter_override_enabled_flag syntax element. For example, the deblocking_filter_override_enabled_flag syntax element may specify whether the deblocking operation for the pictures referring to the PPS is redefined at the picture level or the slice level.

According to the one embodiment, if the value of the deblocking filter control present flag is 1, the deblocking filter override enabled flag and the first deblocking filter disabled flag may be configured/included in the PPS. If the value of the deblocking filter control present flag is 0, the deblocking filter override enabled flag and the first deblocking filter disabled flag may not be present.

In this case, according to the one embodiment, if the value of the first deblocking filter disabled flag is 0, the first luma component filter parameter information may be configured/included in the PPS. If the value of the first deblocking filter disabled flag is 1, the first luma component filter parameter information may not be present.

Thereafter, for example, if the value of the chroma tool offset present flag is 1, the deblocking filter control present flag and the first deblocking filter disabled flag may be identified. In this case, according to the one embodiment, if the value of the deblocking filter control present flag is 1, and the value of the first deblocking filter disabled flag is 0, the first chroma component filter parameter information may be configured/included in the PPS. If the value of the deblocking filter control present flag is 0, or the value of the first deblocking filter disabled flag is 1, the first chroma component filter parameter information may not be present.

According to one existing embodiment in contrast with the one embodiment, the PPS may include syntax of Table 16 below. The syntax of Table 16 below may be a part of the PPS.

TABLE 16

| | Descriptor |
|---|---|
| pic_parameter_set_rbsp( ) { | |
| ... | |
|   init_qp_minus26 | se (v) |
|   cu_qp_delta_enabled_flag | u (1) |
|   pps_chroma_tool_offsets_present_flag | u (1) |
|   if( pps_chroma_tool_offsets_present_flag ) { | |
|     pps_cb_qp_offset | se (v) |
|     pps_cr_qp_offset | se (v) |
|     pps_joint_cbcr_qp_offset_present_flag | u (1) |
|     if( pps_joint_cbcr_qp_offset_present_flag ) | |
|       pps_join_cbcr_qp_offset_value | se (v) |
|     pps_slice_chroma_qp_offsets_present_flag | u (1) |
|     pps_cu_chroma_qp_offset_list_enabled_flag | u (1) |
|   } | |
|   if (pps_cu_chroma_qp_offset_list_enabled_flag ) { | |
| ... | |
|   pps_weighted_pred_flag | u (1) |
|   pps_weighted_bipred_flag | u (1) |
|   deblocking_filter_control_present_flag | u (1) |
|   if( deblocking_filter_control_present_flag ) { | |
|     deblocking_filter_override_enabled_flag | u (1) |
|     pps_deblocking_filter_disabled_flag | u (1) |
|     if( !pps_deblocking_filter_disabled_flag ) { | |
|       pps_beta_offset_div2 | se (v) |
|       pps_tc_offset_div2 | se (v) |
|       pps_cb_beta_offset_div2 | se (v) |
|       pps_cb_tc_offset_div2 | se (v) |

TABLE 16-continued

| | Descriptor |
|---|---|
| pps_cr_beta_offset_div2 | se (v) |
| pps_cr_tc_offset_div2 | se (v) |
| } | |
| } | |
| rpl_info_in_ph_flag | u (1) |
| ... | |

Here, semantics of a syntax element included in the syntax of Table 16 above may be represented, for example, as in Table 15 above.

Further, according to another embodiment, the PPS may include the syntax of Table 2 above, and semantics of a syntax element included in the syntax of Table 2 above may be represented, for example, as in Table 17 below.

According to the one embodiment, like the one existing embodiment, if the value of the first deblocking disabled flag is 0, the first luma component filter parameter information and the first chroma component filter parameter information may be configured/included in the PPS.

In this case, according to the one embodiment, if the value of the chroma tool offset present flag is 1, the first chroma component filter parameter information may be configured/included in the PPS. If the value of the chroma tool offset present flag is 0, the first chroma component filter parameter information may not be present.

As described above, the overall coding efficiency can be enhanced through adaptive processing (encoding/decoding) at the respective levels of PPS, PH, and SH so that the information related to the deblocking filter being applied to

TABLE 17 pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0. When ChromaArrayType is equal to 0, the value of pps_cb_beta_offset_div2 and pps_cb_tc_offset_div2 shall be equal to 0.
pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cb_tc_offset_div2 are both inferred to be equal to 0. When ChromaArrayType is equal to 0, the value of pps cr beta offset div2 and pps cr tc offset_div2 shall be equal to 0.

That is, if the value of the first deblocking filter disabled flag is 0, the first luma component filter parameter information and the first chroma component filter parameter information may be configured/included in the PPS, but according to the one embodiment, if the value of the ChromaArrayType is 0, the value of the first chroma component filter parameter information may be limited to 0.

Further, according to another embodiment, the PPS may include syntax of Table 18 below, and the syntax of Table 18 below may be a part of the PPS.

the chroma components is transmitted and signaled/parsed only in case that the source or coded picture/image is not the monochrome image.

According to still another embodiment proposed in the present document, the information related to the deblocking filter may be signaled as follows.

According to the one embodiment as described above, the PPS may include syntax of Table 19 below. The syntax of Table 19 below may be a part of the PPS.

TABLE 18

| | Descriptor |
|---|---|
| pic_parameter_set_rbsp( ) { | |
| ... | ue (v) |
| if( !pps_deblocking_filter_disabled_flag ) { | |
| pps_beta_offset_div2 | se (v) |
| pps_tc_offset_div2 | se (v) |
| if(pps_chroma_tool_offsets_present_flag){ | |
| pps_cb_beta_offset_div2 | se (v) |
| pps_cb_tc_offset_div2 | se (v) |
| pps_cr_beta_offset_div2 | se (v) |
| pps_cr_tc_offset_div2 | se (v) |
| } | |
| } | |
| ... | |

Here, semantics of a syntax element included in the syntax of Table 18 above may be represented, for example, as in Table 3 or Table 17 above.

The information related to the deblocking filter may include the first deblocking filter disabled flag, the first luma component filter parameter information, the first chroma component filter parameter information, and the chroma tool offset present flag.

TABLE 19

| | Descriptor |
|---|---|
| pic_parameter_set_rbsp( ) { | |
| ... | ue (v) |
| deblocking_filter_control_present_flag | u (1) |
| if( deblocking_filter_control_present_flag ) { | |
| pps_chroma_deblocking_params_present_flag | u (1) |
| deblocking_filter_override_enable_flag | u (1) |
| if(deblocking_filter_overried_enabled_flag && | |
| pps_chroma_deblocking_params_present_flag) | |
| chroma_deblocking_filter_override_enabled_flag | u (1) |
| pps_deblocking_filter_disabled_flag | u (1) |
| if( !pps_deblocking_filter_disabled_flag ) { | |
| pps_beta_offset_div2 | se (v) |
| pps_tc_offset_div2 | se (v) |
| if( pps_chroma_deblocking_params_present_flag ) { | |
| pps_cb_beta_offset_div2 | se (v) |
| pps_cb_tc_offset_div2 | se (v) |
| pps_cr_beta_offset_div2 | se (v) |
| pps_cr_tc_offset_div2 | se (v) |
| } | |
| } | |
| } | |
| ... | |

Here, semantics of a syntax element included in the syntax of Table 19 above may be represented, for example, as in Table 3 and Table 15 above, and Table 20 below.

TABLE 20 pps_chroma_deblocking_params_present_flag equal to 1 specifies that chroma deblocking related syntax elements are present in the PPS RBSP syntax structure. pps_chroma_deblocking_params_present_flag equal to 0 specifies that chroma deblocking related syntax elements are not present in the PPS RBSP syntax structure. When ChromaArrayType is equal to 0, the value of pps_chroma_deblocking_params_present_flag shall be equal to 0.
chrome_deblocking_filter_override_enabled_flag equal to 1 specifies that chroma deblocking related syntax. elements are present in the picture header and slice header RBSP syntax structure.
chroma_deblocking_filter_override_enabled_flag equal to 0 specifies that chroma deblocking related syntax elements are not present in the picture header and slice header RBSP syntax structure. When ChromaArrayType is equal to 0, the value of deblocking_filter_chroma_override_enabled_flag shall be equal to 0.

The information related to the deblocking filter may include the deblocking filter control present flag, a chroma deblocking parameter present flag, the deblocking filter override enabled flag, a chroma deblocking filter override enabled flag, the first deblocking filter disabled flag, the first luma component filter parameter information, and the first chroma component filter parameter information.

Here, the chroma deblocking parameter present flag may be related to whether the chroma deblocking related information is present in the PPS. That is, the chroma deblocking parameter present flag may indicate/represent whether the chroma deblocking relates information is present in the PPS.

For example, the chroma deblocking parameter present flag may be represented in the form of a pps_chroma_deblocking_params_present_flag syntax element. For example, the pps_chroma_deblocking_params_present_flag syntax element may specify whether the chroma deblocking related information is present in the PPS.

The chroma deblocking filter override enabled flag may be related to whether the chroma deblocking related information is present in the PH and/or the SH. That is, the chroma deblocking filter override enabled flag may indicate/represent whether the chroma deblocking related information is present in the PH and/or the SH.

For example, the chroma deblocking filter override enabled flag may be represented in the form of a chroma_deblocking_filter_override_enabled_flag syntax element. For example, the chroma_deblocking_filter_override_enabled_flag syntax element may specify whether the chroma deblocking related information is present in the PH or the SH.

According to the one embodiment, if the value of the deblocking filter control present flag is 1, the chroma deblocking parameter present flag and the deblocking filter override enabled flag may be configured/included in the PPS. If the value of the deblocking filter control present flag is 0, the chroma deblocking parameter present flag and the deblocking filter override enabled flag may not be present.

In relation to this, if the value of the ChromaArrayType is 0, the value of the deblocking parameter present flag may be limited to 0.

In this case, according to the one embodiment, if the deblocking filter override enabled flag is 1, and the value of the chroma deblocking parameter present flag is 1, the chroma deblocking filter override enabled flag may be configured/included in the PPS. If the deblocking filter override enabled flag is 0, or the value of the chroma deblocking parameter present flag is 0, the chroma deblocking filter override enabled flag may not be present.

In relation to this, if the value of the ChromaArrayType is 0, the value of the chroma deblocking filter override enabled flag may be limited to 0.

Thereafter, for example, if the value of the first deblocking filter disabled flag is 0, the first luma component filter parameter information and the first chroma component filter parameter information may be configured/included in the PPS.

In this case, according to the one embodiment, if the chroma deblocking parameter present flag is 1, the first chroma component filter parameter information may be configured/included in the PPS. If the value of the chroma deblocking parameter present flag is 0, the first chroma component filter parameter information may not be present.

In relation to this, according to the one embodiment, the PH may include syntax of Table 21 below. The syntax of Table 21 below may be a part of the PH.

TABLE 21

| | Descriptor |
|---|---|
| picture_header_structure( ) { | |
| ... | |
|   if( deblocking_filter_override_enabled_flag && dbf_info_in_ph_flag ) { | |
|     ph_deblocking_filter_override_flag | u (1) |
|     if( ph_deblocking_filter_override_flag ) { | |
|       ph_deblocking_filter_disabled_flag | u (1) |
|       if( !ph_deblocking_filter_disabled_flag ) { | |
|         ph_beta_offset_div2 | se (v) |
|         ph_tc_offset_div2 | se (v) |
|   if( pps_chroma_deblocking_params_present_flag && | |
|   chroma_deblocking_filter_override_enabled_flag ) { | |
|     ph_cb_beta_offset_div2 | se (v) |
|     ph_cb_tc_offset_div2 | se (v) |
|     ph_cr_beta_offset_div2 | se (v) |
|     ph_cr_tc_offset_div2 | se (v) |
|   } | |
| } | |

TABLE 21-continued

| | Descriptor |
|---|---|
| ```
    }
  }
  if( picture_header_extension_present_flag ) {
    ph_extension_length
``` | ue (v) |
| ```
    for( i = 0; i < ph_extension_length; i++_
      ph_extension_data_byte[i]
``` | u (8) |
| ```
  }
}
``` | |

Here, semantics of a syntax element included in the syntax of Table 21 above may be represented, for example, as in Table 5 and Table 20 above.

The information related to the deblocking filter may include the second deblocking filter override flag, the second deblocking filter disabled flag, the second luma component filter parameter information, and the second chroma component filter parameter information.

According to the one embodiment, like the one existing embodiment, in case that the value of the deblocking filter override enabled flag is 1, and the value of the syntax element dbf_info_in_ph_flag related to whether the deblocking filter information (parameter) is present in the PH is 1, the second deblocking filter override flag may be configured/included in the PH. In case that the value of the deblocking filter override enabled flag is 0, or the value of the syntax element dbf_info_in_ph_flag is 0, the second deblocking filter override flag may not be present.

In this case, according to the one embodiment, if the value of the second deblocking filter override flag is 1, the second deblocking filter disabled flag may be configured/included in the PH. If the value of the second deblocking filter override flag is 0, the second deblocking filter disabled flag may not be present.

Thereafter, for example, if the value of the second deblocking filter disabled flag is 0, the second luma component filter parameter information and the second chroma component filter parameter information may be configured/included in the PH.

In this case, according to the one embodiment, in case that the value of the chroma deblocking parameter present flag is 1, and the value of the chroma deblocking filter override enabled flag is 1, the second chroma component filter parameter information may be configured/included in the PH. If the value of the chroma deblocking parameter present flag is 0, or the value of the chroma deblocking filter override enabled flag is 0, the second chroma component filter parameter information may not be present.

According to the one embodiment, the SH may include syntax of Table 22 below. The syntax of Table 22 below may be a part of the SH.

TABLE 22

| | Descriptor |
|---|---|
| ```
slice_header( ) {
  ...
  if( deblocking_filter_override_enabled_flag && !dbf_info_in_pb_flag )
    slice_deblocking_filter_override_flag
``` | u (1) |
| ```
  if( slice_deblocking_filter_override_flag ) {
    slice_deblocking_filter_disabled_flag
``` | u (1) |
| ```
    if( !slice_deblocking_filter_disabled_flag ) {
      slice_beta_offset_div2
``` | se (v) |
| ```
      slice_tc_offset_div2
``` | se (v) |
| ```
  if( pps_chroma_deblocking_params_present_flag &&
  chroma_deblocking_filter_override_enabled_flag) {
      slice_cb_beta_offset_div2
``` | se (v) |
| ```
      slice_cb_tc_offset_div2
``` | se (v) |
| ```
      slice_cr_beta_offset_div2
``` | se (v) |
| ```
      slice_cr_tc_offset_div2
``` | se (v) |
| ```
    }
   }
  }
  ...
``` | |

Here, semantics of a syntax element included in the syntax of Table 22 above may be represented, for example, as in Table 7 and Table 20 above.

The information related to the deblocking filter may include the third deblocking filter override flag, the third deblocking filter disabled flag, the third luma component filter parameter information, and the third chroma component filter parameter information.

According to the one embodiment, like the one existing embodiment, in case that the value of the deblocking filter override enabled flag is 1, and the value of the syntax element dbf_info_in_ph_flag is 0, the third deblocking filter override flag may be configured/included in the SH. In case that the value of the deblocking filter override enabled flag is 0, or the value of the syntax element dbf_info_in_ph_flag is 1, the third deblocking filter override flag may not be present.

In this case, according to the one embodiment, if the value of the third deblocking filter override flag is 1, the third deblocking filter disabled flag may be configured/included in the SH. If the value of the third deblocking filter override flag is 0, the third deblocking filter disabled flag may not be present.

Thereafter, for example, if the value of the third deblocking filter disabled flag is 0, the third luma component filter parameter information and the third chroma component filter parameter information may be configured/included in the SH.

In this case, according to the one embodiment, in case that the value of the chroma deblocking parameter present flag is 1, and the value of the chroma deblocking filter override enabled flag is 1, the third chroma component filter parameter information may be configured/included in the SH. If the value of the chroma deblocking parameter present flag is 0, or the value of the chroma deblocking filter override enabled flag is 0, the third chroma component filter parameter information may not be present.

The following drawings have been prepared to explain a detailed example of the present document. Since detailed names of devices or detailed terms of signal/message/field described in the drawings are exemplarily presented, the technical features of the present document are not limited to the detailed names used in the drawings.

As described above, with respect to various coded pictures/images including monochrome images, the overall coding efficiency can be enhanced through selective transmission of the information related to the deblocking filter being applied to the luma component and the information related to the deblocking filter being applied to the chroma components.

Figure 11:
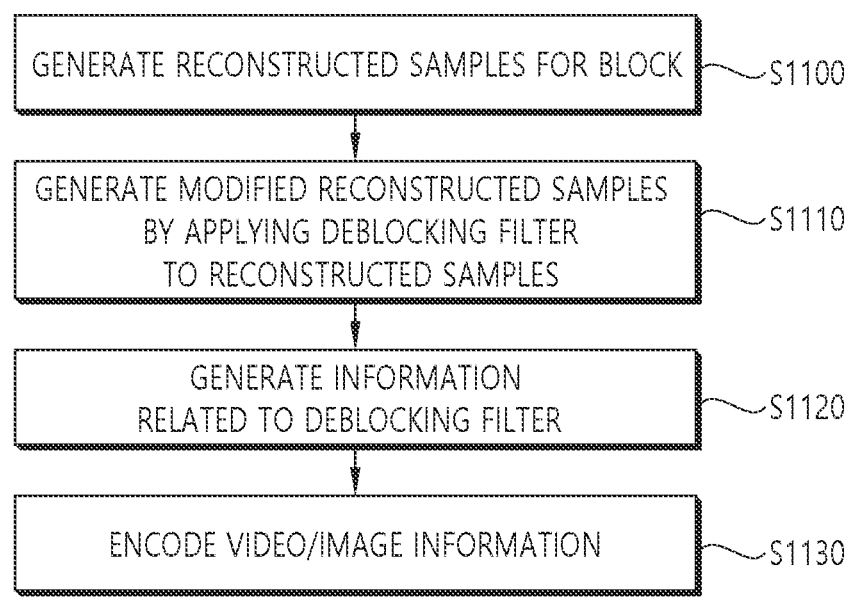
FIGS. 11 and 12 schematically illustrate a video/image encoding method and an example of related components according to embodiment(s) of the present document.
Figure 12:
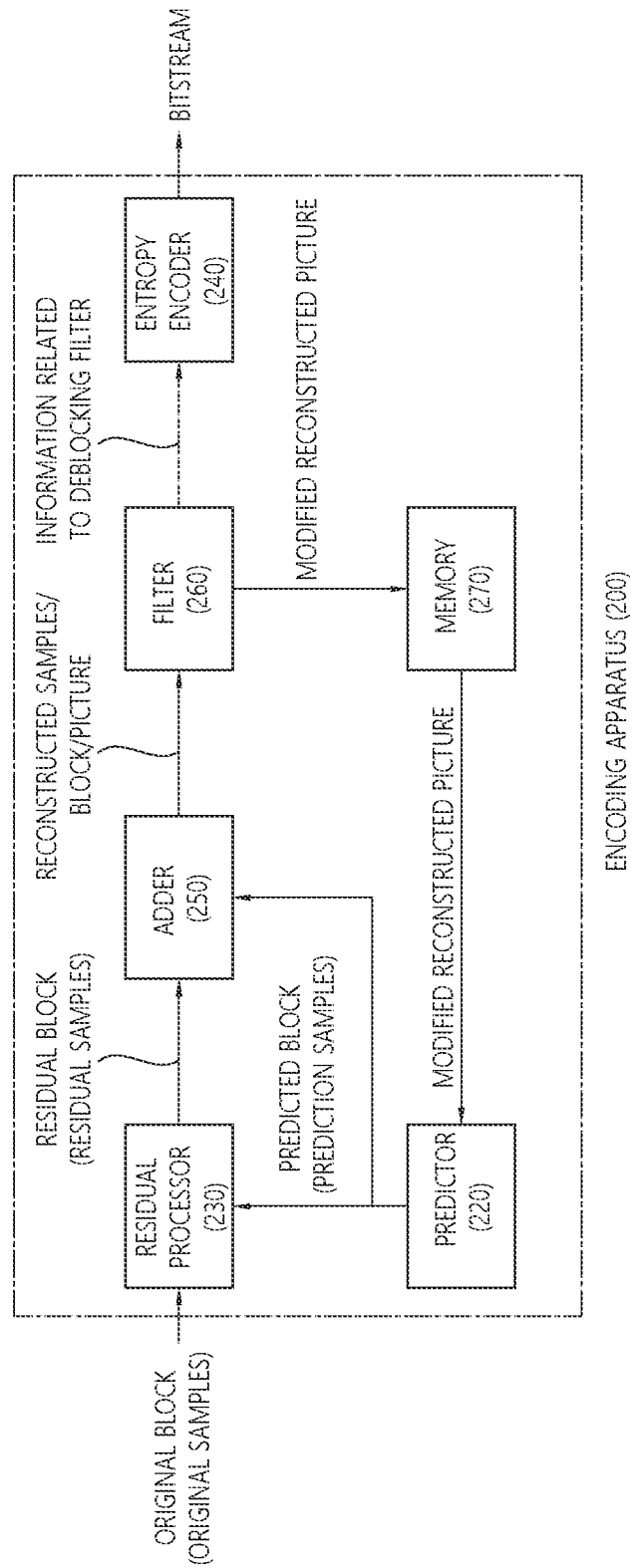

FIGS. 11 and 12 schematically illustrate a video/image encoding method and an example of related components according to embodiment(s) of the present document.

The method disclosed in FIG. 11 may be performed by an encoding apparatus disclosed in FIG. 2 or FIG. 12. Specifically, for example, S1100 of FIG. 11 may be performed by at least one of a residual processor 230, a predictor 220, and/or an adder 250 of the encoding apparatus 200 of FIG. 12, S1110 and S1120 of FIG. 11 may be performed by a filter 260 of the encoding apparatus 200 of FIG. 12, and S1130 of FIG. 11 may be performed by an entropy encoder 240 of the encoding apparatus 200. The method disclosed in FIG. 11 may include the above-described embodiments of the present document.

Referring to FIG. 11, the encoding apparatus generates reconstructed samples for a current block (S1100). As described in FIG. 2, the encoding apparatus may generate the reconstructed picture through procedures of partitioning, intra/inter prediction, and residual processing for the input original picture. Specifically, the encoding apparatus may generate prediction samples for the current block through intra or inter prediction, generate residual samples based on the prediction samples, and derive (modified) residual samples by performing dequantization/inverse transform of the residual samples after performing transform/quantization thereof. The encoding apparatus may generate a reconstructed block including reconstructed samples for the current block based on the prediction samples and the (modified) residual samples. The reconstructed picture may be generated based on the reconstructed block.

The encoding apparatus generates modified reconstructed samples by applying a deblocking filter for the reconstructed samples (S1110). Through the deblocking filtering procedure, the modified reconstructed samples or the reconstructed picture may be generated. As a decoded picture, the modified reconstructed picture may be stored in a decoded picture buffer or a memory 270, and may be used as a reference picture in an inter prediction procedure during the subsequent picture encoding.

The encoding apparatus generates information related to the deblocking filter (S1120).

The information related to the deblocking filter may include at least one of the deblocking filter control present flag, the chroma deblocking parameter present flag, the deblocking filter override enabled flag, the chroma deblocking filter override enabled flag, the first deblocking filter disabled flag, the first luma component filter parameter information, the first chroma component filter parameter information, the second deblocking filter override flag, the second deblocking filter disabled flag, the second luma component filter parameter information, the second chroma component filter parameter information, the third deblocking filter override flag, the third deblocking filter disabled flag, the third luma component filter parameter information, the third chroma component filter parameter information, and/or the chroma tool offset present flag. For example, the information related to the deblocking filter may include at least one of deblocking_filter_control_present_flag, pps_chroma_deblocking_params_present_flag, deblocking_filter_override_enabled_flag, chroma_deblocking_filter_override_enabled_flag, pps_deblocking_filter_disabled_flag, pps_beta_offset_div2, pps_tc_offset_div2, pps_cb_beta_offset_div2, pps_cb_tc_offset_div2, pps_cr_beta_offset_div2, pps_cr_tc_offset_div2, ph_deblocking_filter_override_flag, ph_deblocking_filter_disabled_flag, ph_beta_offset_div2, ph_tc_offset_div2, ph_cb_beta_offset_div2, ph_cb_tc_offset_div2, ph_cr_beta_offset_div2, ph_cr_tc_offset_div2, slice_deblocking_filter_override_flag, slice_deblocking_filter_disabled_flag, slice_beta_offset_div2, slice_tc_offset_div2, slice_cb_beta_offset_div2, slice_cb_tc_offset_div2, slice_cr_beta_offset_div2, slice_cr_tc_offset_div2, and/or the dbf_info_in_ph_flag syntax element.

The encoding apparatus encodes video/image information (S1130). The video/image information may include the information related to the deblocking filter. Further, the video/image information may include various pieces of information according to an embodiment of the present document. For example, the video/image information may include information disclosed in at least one of Tables 2, 4, 6, 8, 10, 11, 13, 14, 16, 18, 19, 21, and/or 22 as described above. Further, the video/image information may include information for picture reconstruction. The information for the picture reconstruction may include the prediction information and the residual information.

The encoded video/image information may be output in the form of a bitstream. The bitstream may be transmitted to the decoding apparatus through a network or a storage medium.

Specifically, the information related to the deblocking filter may include various pieces of information according an embodiment of the present document.

According to an embodiment proposed in the present document, the information related to the deblocking filter may include the chroma tool offset present flag and/or the first chroma component filter parameter information. For example, the first chroma component filter parameter information may be included in the PPS based on the case that the value of the chroma tool offset present flag is 1.

According to an embodiment, the information related to the deblocking filter may further include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma tool offset present flag is 1.

According to an embodiment, the information related to the deblocking filter may further include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma tool offset present flag is 1.

According to an embodiment, the step of generating the modified reconstructed samples may include the step of deriving a chroma array type (ChromaArrayType) that is a variable related to the sampling format of the chroma components. In this case, for example, the value of the first chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the second chroma component filter parameter information. The second chroma component filter parameter information may be related to the deblocking parameter offsets being applied to the chroma components of the slices related to the PH. In this case, for example, the value of the second chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma array type is 0.

According to an embodiment, the step of generating the modified reconstructed samples may include the step of deriving the chroma array type. The information related to the deblocking filter may further include the third chroma component filter parameter information. The third chroma component filter parameter information may be related to the deblocking parameter offsets being applied to the chroma component of the current slice. In this case, for example, the value of the third chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma array type is 0.

According to an embodiment, the information related to the deblocking filter may further include the chroma deblocking parameter present flag and/or the chroma deblocking filter override enabled flag. The chroma deblocking parameter present flag may be related to whether the chroma deblocking related information is present in the PPS. The chroma deblocking parameter present flag may be included in the PPS. The chroma deblocking filter override enabled flag may be related to whether the chroma deblocking related information is present in the PH or the SH. In this case, for example, the chroma deblocking filter override enabled flag may be included in the PPS based on the case that the value of the chroma deblocking parameter present flag is 1.

According to an embodiment, the information related to the deblocking filter may further include the deblocking filter override enabled flag. The deblocking filter override enabled flag may be related to whether the deblocking operation for the pictures referring to the PPS is redefined at the picture level or the slice level. The deblocking filter override enabled flag may be included in the PPS based on the case that the value of the deblocking filter override enabled flag is 1.

According to an embodiment, the information related to the deblocking filter may include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma deblocking parameter present flag is 1, and the value of the chroma deblocking filter override enabled flag is 1.

According to an embodiment, the information related to the deblocking filter may include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma deblocking parameter present flag is 1, and the value of the chroma deblocking filter override enabled flag is 1.

According to an embodiment, the step of generating the modified reconstructed samples may include the step of deriving the chroma array type. In this case, for example, the value of the chroma deblocking parameter present flag may be limited to 0, and the value of the chroma deblocking filter override enabled flag may be limited to 0, based on the case that the value of the chroma array type is 0.

Figure 13:
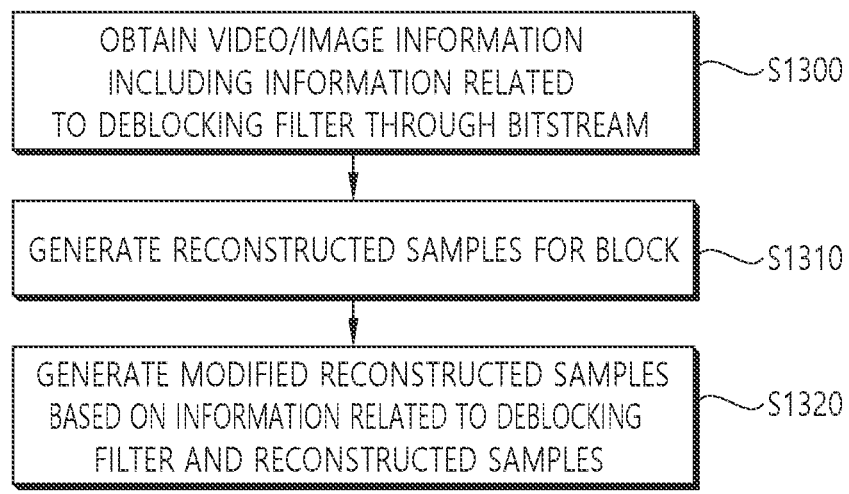
FIGS. 13 and 14 schematically illustrate a video/image decoding method and an example of related components according to an embodiment of the present document.
Figure 14:
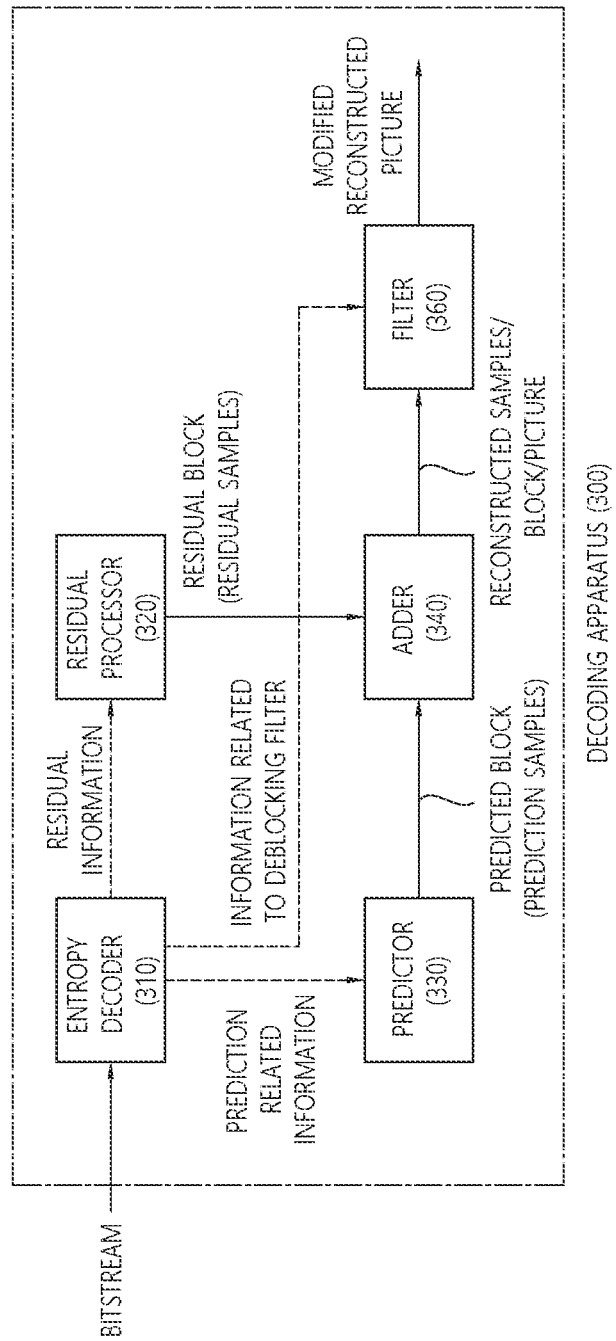

FIGS. 13 and 14 schematically illustrate a video/image decoding method and an example of related components according to an embodiment of the present document.

The method disclosed in FIG. 13 may be performed by a decoding apparatus disclosed in FIG. 3 or FIG. 14. Specifically, for example, S1300 of FIG. 13 may be performed by an entropy decoder 310 of the decoding apparatus 300, S1310 may be performed by at least one of a residual processor 320, a predictor 330, and/or an adder 340 of the decoding apparatus 300, and S1320 may be performed by a filter 360 of the decoding apparatus 300. The method disclosed in FIG. 13 may include the above-described embodiments of the present document.

Referring to FIG. 13, the decoding apparatus receives/obtains video/image information (S1300). The decoding apparatus may receive/obtain the video/image information through a bitstream. The video/image information may include information related to a deblocking filter.

The information related to the deblocking filter may include at least one of the deblocking filter control present flag, the chroma deblocking parameter present flag, the deblocking filter override enabled flag, the chroma deblocking filter override enabled flag, the first deblocking filter disabled flag, the first luma component filter parameter information, the first chroma component filter parameter information, the second deblocking filter override flag, the second deblocking filter disabled flag, the second luma component filter parameter information, the second chroma component filter parameter information, the third deblocking filter override flag, the third deblocking filter disabled flag, the third luma component filter parameter information, the third chroma component filter parameter information, and/or the chroma tool offset present flag. For example, the information related to the deblocking filter may include at least one of deblocking_filter_control_present_flag, pps_chroma_deblocking_params_present_flag, deblocking_filter_override_enabled_flag, chroma_deblocking_filter_override_enabled_flag, pps_deblocking_filter_disabled_flag, pps_beta_offset_div2, pps_tc_offset_div2, pps_cb_beta_offset_div2, pps_cb_tc_offset_div2, pps_cr_beta_offset_div2, pps_cr_tc_offset_div2, ph_deblocking_filter_override_flag, ph_deblocking_filter_disabled_flag, ph_beta_offset_div2, ph_tc_offset_div2, ph_cb_beta_offset_div2, ph_cb_tc_offset_div2, ph_cr_beta_offset_div2, ph_cr_tc_offset_div2, slice_deblocking_filter_override_flag, slice_deblocking_filter_disabled_flag, slice_beta_offset_div2, slice_tc_offset_div2, slice_cb_beta_offset_div2, slice_cb_tc_offset_div2, slice_cr_beta_offset_div2, slice_cr_tc_offset_div2, and/or the dbf_info_in_ph_flag syntax element.

Further, the video/image information may include various pieces of information according to an embodiment of the present document. For example, the video/image information may include information disclosed in at least one of Tables 2, 4, 6, 8, 10, 11, 13, 14, 16, 18, 19, 21, and/or 22 as described above. Further, the video/image information may include information for picture reconstruction. The information for the picture reconstruction may include the prediction information and the residual information.

The decoding apparatus generates reconstructed samples for the current block (S1310). As described above in FIG. 3, the decoding apparatus may generate a reconstructed picture through procedures of intra/inter prediction and residual processing for the current picture. Specifically, the decoding apparatus generates prediction samples for the current block through intra or inter prediction based on prediction information included in the information for the picture reconstruction, and derives residual samples for the current block based on residual information included in the information for the picture reconstruction (based on dequantization/inverse transform). The decoding apparatus may generate a reconstructed block including reconstructed samples for the current block based on the prediction samples and the residual samples. The reconstructed picture may be generated based on the reconstructed block.

The decoding apparatus generates modified reconstructed samples based on the information related to the deblocking filter and the reconstructed samples (S1320). For example, the decoding apparatus may generate the modified reconstructed samples or the modified reconstructed picture by applying the deblocking filter for the reconstructed samples based on the information related to the deblocking filter included in the video/image information. The modified reconstructed picture may be output as the decoded picture and/or may be stored in a decoded picture buffer or a memory 360, and may be used as a reference picture in the inter prediction procedure during the subsequent picture decoding.

Specifically, the information related to the deblocking filter may include various pieces of information according an embodiment of the present document.

According to an embodiment proposed in the present document, the information related to the deblocking filter may include the chroma tool offset present flag and/or the first chroma component filter parameter information. For example, the first chroma component filter parameter information may be included in the PPS based on the case that the value of the chroma tool offset present flag is 1.

According to an embodiment, the information related to the deblocking filter may further include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma tool offset present flag is 1.

According to an embodiment, the information related to the deblocking filter may further include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma tool offset present flag is 1.

According to an embodiment, the step of generating the modified reconstructed samples may include the step of deriving a chroma array type (ChromaArrayType) that is a variable related to the sampling format of the chroma components. In this case, for example, the value of the first chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the second chroma component filter parameter information. The second chroma component filter parameter information may be related to the deblocking parameter offsets being applied to the chroma components of the slices related to the PH. In this case, for example, the value of the second chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma array type is not 0.

According to an embodiment, the step of generating the modified reconstructed samples may include the step of deriving the chroma array type. The information related to the deblocking filter may further include the third chroma component filter parameter information. The third chroma component filter parameter information may be related to the deblocking parameter offsets being applied to the chroma component of the current slice. In this case, for example, the value of the third chroma component filter parameter information may be limited to 0 based on the case that the value of the chroma array type is 0.

According to an embodiment, the step of generating the modified reconstructed samples may include the step of deriving the chroma array type. The information related to the deblocking filter may further include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma array type is not 0.

According to an embodiment, the information related to the deblocking filter may further include the chroma deblocking parameter present flag and/or the chroma deblocking filter override enabled flag. The chroma deblocking parameter present flag may be related to whether the chroma deblocking related information is present in the PPS. The chroma deblocking parameter present flag may be included in the PPS. The chroma deblocking filter override enabled flag may be related to whether the chroma deblocking related information is present in the PH or the SH. In this case, for example, the chroma deblocking filter override enabled flag may be included in the PPS based on the case that the value of the chroma deblocking parameter present flag is 1.

According to an embodiment, the information related to the deblocking filter may further include the deblocking filter override enabled flag. The deblocking filter override enabled flag may be related to whether the deblocking operation for the pictures referring to the PPS is redefined at the picture level or the slice level. The deblocking filter override enabled flag may be included in the PPS based on the case that the value of the deblocking filter override enabled flag is 1.

According to an embodiment, the information related to the deblocking filter may include the second chroma component filter parameter information. The second chroma component filter parameter information may be related to the deblocking parameter offsets being applied to the chroma components of the slices related to the PH. In this case, for example, the second chroma component filter parameter information may be included in the PH based on the case that the value of the chroma deblocking parameter present flag is 1, and the value of the chroma deblocking filter override enabled flag is 1.

According to an embodiment, the information related to the deblocking filter may include the third chroma component filter parameter information. The third chroma component filter parameter information may be related to the deblocking parameter offsets being applied to the chroma component of the current slice. In this case, for example, the third chroma component filter parameter information may be included in the SH based on the case that the value of the chroma deblocking parameter present flag is 1, and the value of the chroma deblocking filter override enabled flag is 1.

According to an embodiment, the step of generating the modified reconstructed samples may include the step of deriving the chroma array type. In this case, for example, the value of the chroma deblocking parameter present flag may be limited to 0, and the value of the chroma deblocking filter override enabled flag may be limited to 0, based on the case that the value of the chroma array type is 0.

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present document.

The method according to the embodiments of the present document described above may be implemented in software. The encoding apparatus and/or decoding apparatus according to the present document may be included in a device that performs image processing, for example, a TV, a computer, a smartphone, a set-top box, or a display device.

When the embodiments of the present document are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present document may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the embodiments of the present document are applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the embodiments of the present document are applied may be produced in the form of a computer-executed program, and may be stored in a computer-readable recording medium. The multimedia data having the data structure according to the embodiment(s) of the present document may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment(s) of the present document may be implemented as a computer program product by program code, and the program code may be executed in a computer according to an embodiment(s) of the present document. The program code may be stored on a carrier readable by a computer.

Figure 15:
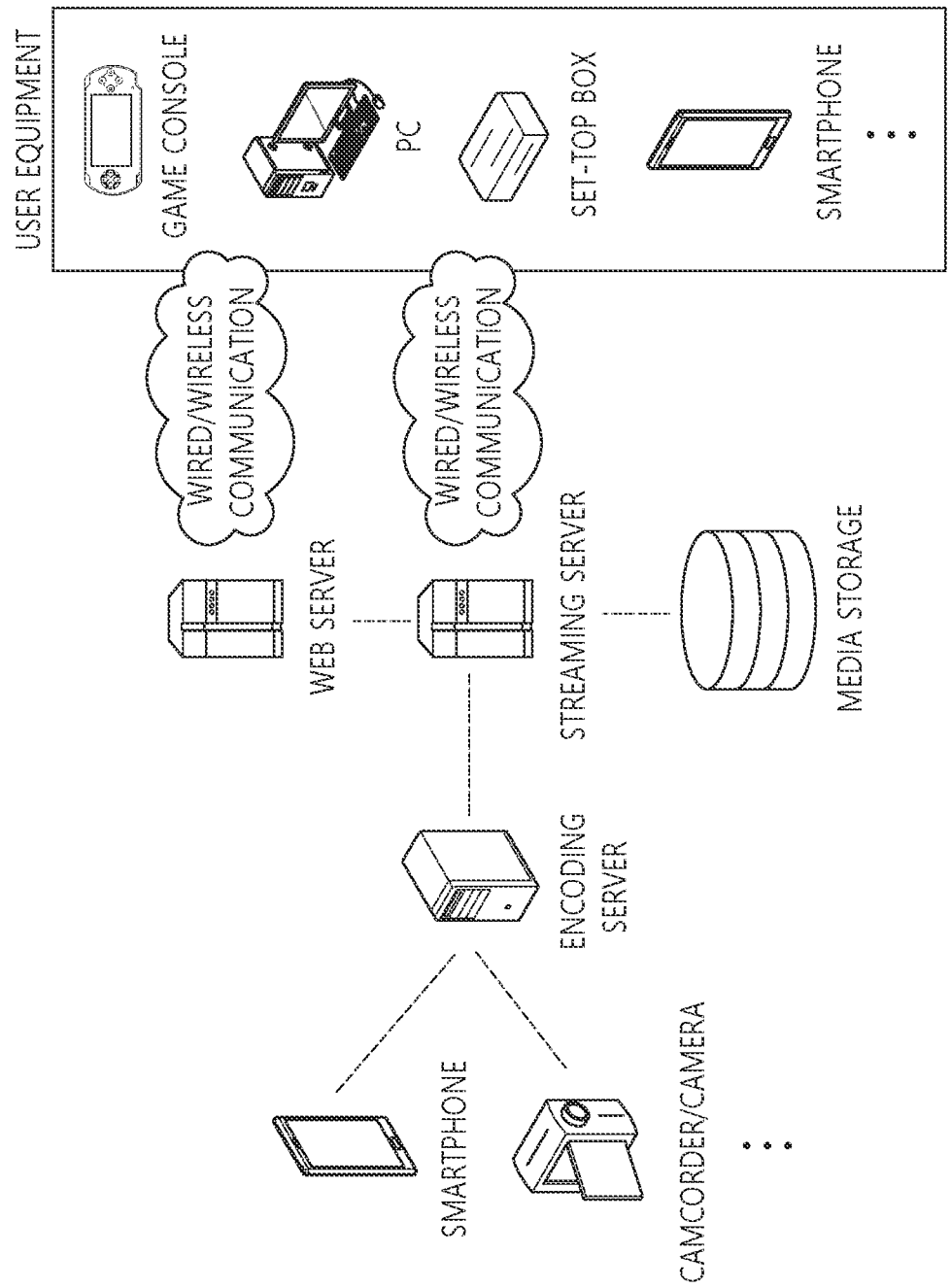
FIG. 15 illustrates an example of a content streaming system to which embodiments disclosed in the present document are applicable.

FIG. 15 is a diagram illustrating a structure of a content streaming system to which the embodiments of the present document are applied.

Referring to FIG. 15, the content streaming system to which the embodiments of the present document are applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present document are applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

Claims described in the present specification may be combined in various methods. For example, the technical features of method claims of the present specification may be combined and implemented as a device, and the technical features of device claims of the present specification may be combined and implemented as a method. Further, the technical features of the method claims of the present specification and the technical features of the device claims thereof may be combined and implemented as a device, and the technical features of the method claims of the present specification and the technical features of the device claims thereof may be combined and implemented as a method.

What is claimed is:

1. An image decoding method performed by a decoding apparatus, comprising:
    obtaining image information from a bitstream, the image information including information related to a deblocking filter;
    generating reconstructed samples for a current block; and
    performing in-loop filtering on the reconstructed samples, the in-loop filtering including deblocking filtering based on the information related to the deblocking filter,
    wherein a chroma tool offset present flag is included in a picture parameter set (PPS) of the bitstream,
    wherein the chroma tool offset present flag equal to 1 indicates that chroma tool offset related information is present in the PPS, and the chroma tool offset present flag equal to 0 indicates that the chroma tool offset related information is not present in the PPS,
    wherein the information related to the deblocking filter includes at least one of first chroma component filter parameter information, second chroma component filter parameter information, or third chroma component filter parameter information,
    wherein the first chroma component filter parameter information indicates deblocking parameter offsets being applied to chroma components of slices referring to the PPS,
    wherein the second chroma component filter parameter information indicates deblocking parameter offsets being applied to chroma components of slices in a current picture,
    wherein the third chroma component filter parameter information indicates deblocking parameter offsets being applied to chroma components of a current slice,
    wherein, based on the chroma tool offset present flag being equal to 1, the second chroma component filter parameter information is signaled from a picture header (PH) in the bitstream, and
    wherein, based on the chroma tool offset present flag being equal to 0, the second chroma component filter parameter information is not signaled from the PH in the bitstream.

2. The image decoding method of claim 1, wherein, based on the chroma tool offset present flag being equal to 1, the third chroma component filter parameter information is signaled from a slice header (SH) in the bitstream, and
    wherein, based on the chroma tool offset present flag being equal to 0, the third chroma component filter parameter information is not signaled from the SH in the bitstream.

3. The image decoding method of claim 1, wherein performing the in-loop filtering comprises deriving a chroma array type that is a variable related to a sampling format of a chroma component, and
   wherein a value of the first chroma component filter parameter information is limited to 0 based on a case that a value of the chroma array type is 0.

4. The image decoding method of claim 1, wherein performing the in-loop filtering comprises deriving a chroma array type that is a variable related to a sampling format of a chroma component, and
   wherein a value of the second chroma component filter parameter information is limited to 0 based on a case that a value of the chroma array type is 0.

5. The image decoding method of claim 1, wherein performing the in-loop filtering comprises deriving a chroma array type that is a variable related to a sampling format of a chroma component, and
   wherein the second chroma component filter parameter information is included in the PH based on a case that a value of the chroma array type is not 0.

6. The image decoding method of claim 1, wherein performing the in-loop filtering comprises deriving a chroma array type that is a variable related to a sampling format of a chroma component, and
   wherein a value of the third chroma component filter parameter information is limited to 0 based on a case that a value of the chroma array type is 0.

7. The image decoding method of claim 1, wherein performing the in-loop filtering comprises deriving a chroma array type that is a variable related to a sampling format of a chroma component, and
   wherein the third chroma component filter parameter information is included in a slice header (SH) based on a case that a value of the chroma array type is not 0.

8. The image decoding method of claim 1, wherein the information related to the deblocking filter further comprises a chroma deblocking parameter present flag and a chroma deblocking filter override enabled flag,
   wherein the chroma deblocking parameter present flag is related to whether chroma deblocking related information is present in the PPS, and the chroma deblocking parameter present flag is included in the PPS,
   wherein the chroma deblocking filter override enabled flag is related to whether the chroma deblocking related information is present in the PH or a slice header (SH), and
   wherein the chroma deblocking filter override enabled flag is included in the PPS based on a case that a value of the chroma deblocking parameter present flag is 1.

9. The image decoding method of claim 8, wherein the information related to the deblocking filter further comprises a deblocking filter override enabled flag,
   wherein the deblocking filter override enabled flag is related to whether a deblocking operation for pictures referring to the PPS is redefined at a picture level or a slice level, and
   wherein the chroma deblocking filter override enabled flag is included in the PPS based on a case that a value of the deblocking filter override enabled flag is 1.

10. The image decoding method of claim 9, wherein the second chroma component filter parameter information is included in the PH based on a case that a value of the chroma deblocking parameter present flag is 1 and a value of the chroma deblocking filter override enabled flag is 1.

11. The image decoding method of claim 8, wherein the third chroma component filter parameter information is included in the SH based on a case that a value of the chroma deblocking parameter present flag is 1 and a value of the chroma deblocking filter override enabled flag is 1.

12. The image decoding method of claim 8, wherein performing the in-loop filtering comprises deriving a chroma array type that is a variable related to a sampling format of a chroma component,
   wherein a value of the chroma deblocking parameter present flag is limited to 0 based on a case that a value of the chroma array type is 0, and
   wherein a value of the chroma deblocking filter override enabled flag is limited to 0 based on a case that the value of the chroma array type is 0.

13. An image encoding method performed by an encoding apparatus, comprising:
   generating reconstructed samples for a current block;
   applying an in-loop filter including a deblocking filter to the reconstructed samples;
   generating information related to the deblocking filter; and
   encoding image information including the information related to the deblocking filter,
   wherein a chroma tool offset present flag is encoded into a picture parameter set (PPS) in a bitstream,
   wherein the chroma tool offset present flag equal to 1 indicates that chroma tool offset related information is present in the PPS, and the chroma tool offset present flag equal to 0 indicates that the chroma tool offset related information is not present in the PPS,
   wherein the information related to the deblocking filter includes at least one of first chroma component filter parameter information, second chroma component filter parameter information, or third chroma component filter parameter information,
   wherein the first chroma component filter parameter information indicates deblocking parameter offsets being applied to chroma components of slices referring to the PPS,
   wherein the second chroma component filter parameter information indicates deblocking parameter offsets being applied to chroma components of slices in a current picture,
   wherein the third chroma component filter parameter information indicates deblocking parameter offsets being applied to chroma components of a current slice,
   wherein, based on the chroma tool offset present flag being equal to 1, the second chroma component filter parameter information is encoded into a picture header (PH) in the bitstream, and
   wherein, based on the chroma tool offset present flag being equal to 0, the second chroma component filter parameter information is not encoded into the PH in the bitstream.

14. A transmission method of data for image information, comprising:
   obtaining a bitstream of the image information, wherein the bitstream is generated by generating reconstructed samples for a current block, applying an in-loop filter including a deblocking filter to the reconstructed samples, generating information related to the deblocking filter, and encoding the image information including the information related to the deblocking filter; and
   transmitting the data including the bitstream of the image information,
   wherein a chroma tool offset present flag is encoded into a picture parameter set (PPS) in the bitstream, wherein the chroma tool offset present flag equal to 1 indicates that chroma tool offset related information is present in the PPS, and the chroma tool offset present flag equal to 0 indicates that the chroma tool offset related information is not present in the PPS, wherein the information related to the deblocking filter includes at least one of first chroma component filter parameter information, second chroma component filter parameter information, or third chroma component filter parameter information, wherein the first chroma component filter parameter information indicates deblocking parameter offsets being applied to chroma components of slices referring to the PPS, wherein the second chroma component filter parameter information indicates deblocking parameter offsets being applied to chroma components of slices in a current picture, wherein the third chroma component filter parameter information indicates deblocking parameter offsets being applied to chroma components of a current slice, wherein, based on the chroma tool offset present flag being equal to 1, the second chroma component filter parameter information is encoded into a picture header (PH) in the bitstream, and wherein, based on the chroma tool offset present flag being equal to 0, the second chroma component filter parameter information is not encoded into the PH in the bitstream.

* * * * *